US008315456B2

(12) United States Patent
Hicks

(10) Patent No.: US 8,315,456 B2
(45) Date of Patent: Nov. 20, 2012

(54) METHODS AND APPARATUS FOR AUDITING SIGNAGE

(75) Inventor: Michael Alan Hicks, Clearwater, FL (US)

(73) Assignee: The Nielsen Company, Schaumburg, IL (US)

( * ) Notice: Subject to any disclaimer, the term of this patent is extended or adjusted under 35 U.S.C. 154(b) by 1023 days.

(21) Appl. No.: 12/101,033

(22) Filed: Apr. 10, 2008

(65) Prior Publication Data

US 2009/0257620 A1 Oct. 15, 2009

(51) Int. Cl.
*G06K 9/00* (2006.01)
*G06K 9/68* (2006.01)

(52) U.S. Cl. ........................................ 382/154; 382/218
(58) Field of Classification Search .................. 382/103, 382/218
See application file for complete search history.

(56) References Cited

U.S. PATENT DOCUMENTS

| | | | |
|---|---|---|---|
| 4,623,230 A | 11/1986 | Weinblatt | |
| 5,146,219 A * | 9/1992 | Zechnall | 340/995.24 |
| 5,465,115 A | 11/1995 | Conrad et al. | |
| 5,644,318 A * | 7/1997 | Janky et al. | 342/357.31 |
| 5,699,444 A * | 12/1997 | Palm | 382/106 |
| 5,923,252 A | 7/1999 | Sizer et al. | |
| 6,195,455 B1 * | 2/2001 | Mack et al. | 382/154 |
| 6,252,522 B1 * | 6/2001 | Hampton et al. | 340/905 |
| 6,266,442 B1 * | 7/2001 | Laumeyer et al. | 382/190 |
| 6,418,372 B1 * | 7/2002 | Hofmann | 701/209 |
| 6,453,056 B2 * | 9/2002 | Laumeyer et al. | 382/104 |
| 6,484,148 B1 * | 11/2002 | Boyd | 705/14.64 |
| 6,507,802 B1 * | 1/2003 | Payton et al. | 702/150 |
| 6,538,623 B1 | 3/2003 | Parnian et al. | |
| 6,580,916 B1 | 6/2003 | Weisshaar et al. | |
| 6,728,708 B1 * | 4/2004 | Yotka et al. | 1/1 |
| 6,810,397 B1 | 10/2004 | Qian et al. | |
| 6,958,710 B2 | 10/2005 | Zhang et al. | |
| 7,099,952 B2 | 8/2006 | Wong et al. | |
| 7,215,280 B1 * | 5/2007 | Percy et al. | 342/357.52 |
| 7,386,394 B2 * | 6/2008 | Shulman | 701/213 |
| 7,571,051 B1 * | 8/2009 | Shulman | 701/213 |
| 2002/0034384 A1 * | 3/2002 | Mikhail | 396/310 |
| 2002/0097193 A1 | 7/2002 | Powers | |
| 2002/0163444 A1 | 11/2002 | Budnovitch | |

(Continued)

FOREIGN PATENT DOCUMENTS

WO 2006015188 2/2006

(Continued)

OTHER PUBLICATIONS

"International Preliminary Report on Patentability," issued by the International Bureau of the WIPO in connection with International Application No. PCT/US2008/059952, on Oct. 12, 2010, 5 pages.

(Continued)

*Primary Examiner* — Bhavesh Mehta
*Assistant Examiner* — Utpal Shah
(74) *Attorney, Agent, or Firm* — Hanley, Flight & Zimmerman, LLC

(57) ABSTRACT

Example methods and apparatus for auditing signage are disclosed. A disclosed example method involves directing an operator to a signage location and capturing an image of a signage at the signage location. The example method also includes detecting an actual characteristic of the signage based on the image and comparing the actual characteristic to an expected characteristic.

21 Claims, 21 Drawing Sheets

U.S. PATENT DOCUMENTS

| | | | |
|---|---|---|---|
| 2003/0126013 A1* | 7/2003 | Shand | 705/14 |
| 2004/0064245 A1 | 4/2004 | Knockeart et al. | |
| 2004/0080452 A1* | 4/2004 | Percy et al. | 342/357.07 |
| 2005/0060299 A1* | 3/2005 | Filley et al. | 707/3 |
| 2005/0149398 A1 | 7/2005 | McKay | |
| 2006/0015339 A1 | 1/2006 | Charlesworth et al. | |
| 2006/0028454 A1 | 2/2006 | Baker et al. | |
| 2006/0190318 A1 | 8/2006 | Downey et al. | |
| 2006/0229931 A1 | 10/2006 | Fligler et al. | |
| 2006/0271946 A1 | 11/2006 | Woundy et al. | |
| 2007/0090937 A1 | 4/2007 | Stabler | |
| 2007/0174108 A1 | 7/2007 | Monster | |
| 2007/0294705 A1* | 12/2007 | Gopalakrishnan et al. | 719/315 |
| 2009/0049004 A1* | 2/2009 | Nurminen et al. | 707/1 |

FOREIGN PATENT DOCUMENTS

WO  2006015339  2/2006

OTHER PUBLICATIONS

"PCT Written Opinion of the International Searching Authority," issued by the International Searching Authority on Nov. 7, 2008, in connection with corresponding international application No. PCT/US08/59952 (4 Pages).

"PCT International Search Report," issued by the International Searching Authority on Nov. 7, 2008, in connection with corresponding international application No. PCT/US08/59952 (2 Pages).

* cited by examiner

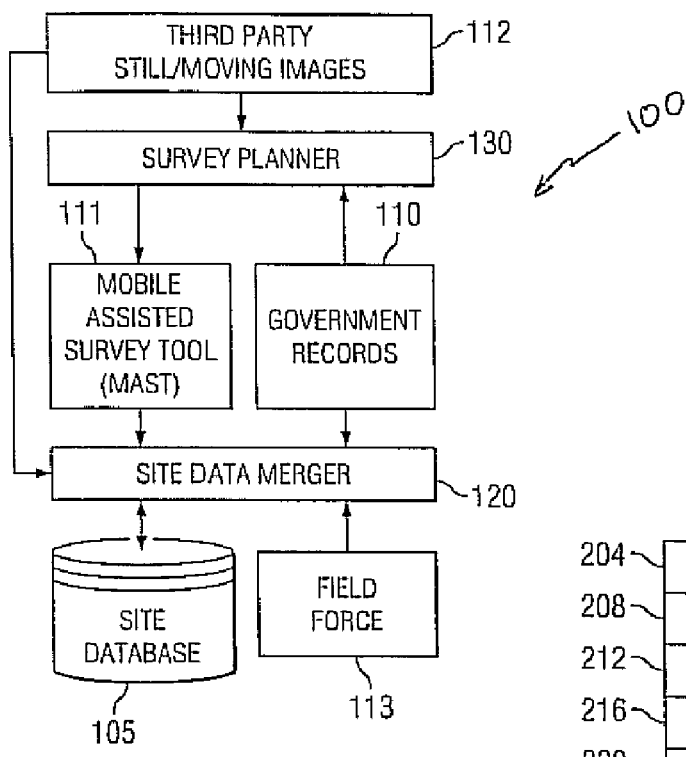

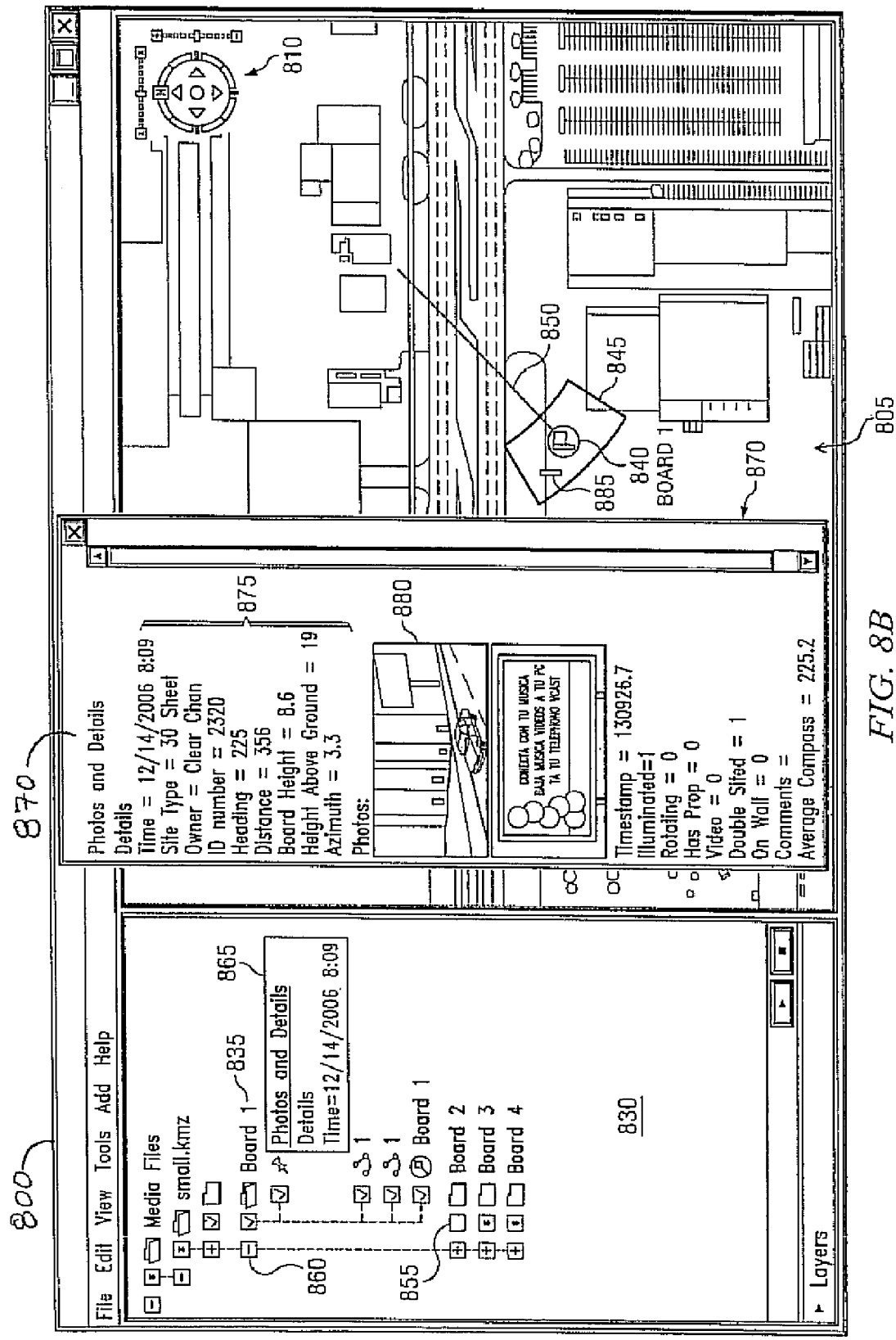

*FIG. 9A*

```
<?xml version="1.0" encoding="UTF-8"?>
<kml xmlns="http://earth.google.com/kml/2.1">
<Document>
        <name>Board 1.kml</name>                    ~905
                <Style id="style">
                        <IconStyle>
                                <Icon>
                                        <href>http://maps.google.com/
                                        mapfiles/kml/pal4/icon29.png</href>
                                </Icon>
                        </IconStyle>
                </Style>
915 ~   <Folder>
                <name>Board 1</name>  ~910
                <open>1</open>
                <Placemark>
                        <name>Photos and Details</name>
                        <description><![CDATA[Details<br>Time = 6/1/2003 6:25<br>Site
        Type = Bulletin 3<br>Owner = Clear Chan<br>ID number = <br>Heading =
        29<br>Distance = 210.5<br>Board Height = 12.1<br>Azimuth =
925     13<br><br>Photos:<br>  <img src="firstday.kmz/1a.jpg" width=400><br><br>  <img
        src="firstday.kmz/1b.jpg" width=400><br>Timestamp = 214235.75<br>Illuminated =
        0<br>Rotating = 0<br>Has Prop = 0<br>Video = 0<br>Double Sited = 0<br>On Wall
930     = 0<br>Comments = <br>Average Compass = 28.4<br>]]></description>
                </Placemark>
                <Placemark>
                        <name>1</name>
                        <Style>
                                <LineStyle>
                                        <color>ff00ffff</color>
                                        <width>5</width>              945
                                </LineStyle>
935                     </Style>
                        <LineString>
                                <coordinates>
        -82.5048533333333,28.009795,0 -82.5045374926211,28.0102997180162,0
                                <coordinates
                        </LineString>                                           940
                </Placemark>
```

FROM FIG. 9A

```xml
<Placemark>
    <name>1</name>
    <Style>
        <LineStyle>
            <color>7f00ff00</color>
            <width>10</width>
        </LineStyle>
    </Style>
    <LineString>
        <coordinates>
-82.50471708832021,28.0102174270353,0 -82.5046985094548,28.0102146840026,0
-82.5046830270669,28.0102091979372,0 -
82.50466754467909,28.0102037118718,0 -82.5046520622912,28.0101982258065,0
-82.50463657990341,28.0101899967084,0 -
82.5046210975155,28.010184510643,0 -82.50460561512762,28.0101762815449,0
-82.50459013273981,28.0101680524468,0 -
82.50457465035191,28.0101598233487,0 -82.5045622644417,28.01015159425061,0
-82.50454678205379,28.0101406221198,0 -
82.5045343961435,28.0101323930217,0 -82.5045220102332,28.0101214208909,0
-82.50431454623602,28.0103271483432,0 -
82.504336221579,28.01034360653940 -82.504357896922,28.0103573217029,0
-82.50437957226501,28.01037377989911,0 -
82.504401247608,28.01038749506250 -82.50442601942849,28.010401210226,0
-82.5044507912491,28.01041492538951,0 -
82.50447556306970 28.01042589752030 -82.5045003348902 28.0104368696511,0
-82.5045251067108,28.0104478417819,0 -
82.50454987853141,28.0104588139127,0 -82.5045777468295,28.0104670430108,0
-82.50460561512762,28.0104752721088,0 -
82.50463038694819,28.0104807581742,0 -82.50471708832021,28.0102174270353,0
        </coordinates>
    </LineString>
</Placemark>
<Placemark>
    <name>Board 1</name>
    <LookAt>
        <longitude>-82.50366366573951</longitude>
        <latitude>28.01025174247392</latitude>
        <altitude>0</altitude>
        <range>229.5423436858966</range>
        <tilt>-3.510447877517112e-010</tilt>
        <heading>0.0005204647634436471</heading>
        <altitudeMode>relativeToGround</altitudeMode>
    </LookAt>
    <styleUrl>#style</styleUrl>
    <Point>
        <coordinates>-82.50469141146229,28.01028014624701,0</coordinates>
    </Point>
</Placemark>
</Folder>
</Document>
</kml>
```

FIG. 9B

METHODS AND APPARATUS FOR AUDITING SIGNAGE

FIELD OF THE DISCLOSURE

This disclosure relates generally to media exposure measurement systems and, more particularly, to methods and apparatus for auditing signage.

BACKGROUND

Product manufacturers, service providers, and advertisers are often interested in consumer exposure to advertisements such as billboards, signs, and/or other indoor and/or outdoor public advertising. Known techniques for monitoring consumer exposure to advertisements include conducting surveys and/or counting consumers or quantifying amounts of traffic that pass by advertisements. To develop such surveys and to correlate passersby traffic with advertisement content, information about the advertisements of interest should be accurately recorded to generate meaningful exposure study results.

It is often difficult to obtain accurate records that correctly reflect content, location, etc. of physical advertisements (e.g., billboard media, poster media, mural media, etc.) because such advertisements are constantly changing and are owned by many different advertisement media companies, some of which may not keep accurate records of their displayed advertisements and/or may not provide access to their records. In some instances, government agencies may sometimes conduct surveys of advertisement media locations within different municipalities. However, such survey information may quickly become outdated and/or inaccurate and/or may not contain as much detailed information as would be desired to conduct advertisement exposure studies.

BRIEF DESCRIPTION OF THE DRAWINGS

FIG. 1 is a block diagram of an example media site data collection system used to collect media site information as described herein.

FIG. 2 illustrates an example data structure that may be used to implement an example site database of FIG. 1.

FIGS. 8A, 8B and 8C depict example user interfaces that may be implemented in connection with the example site data merger of FIG. 7 to show locations of surveyed media sites in connection with media site data and to enable users to verify and/or update the media site data.

FIGS. 9A and 9B illustrate an example data structure that may be used to represent media site data for use by the example site data merger of FIGS. 1 and 7.

DETAILED DESCRIPTION

Figure 3:
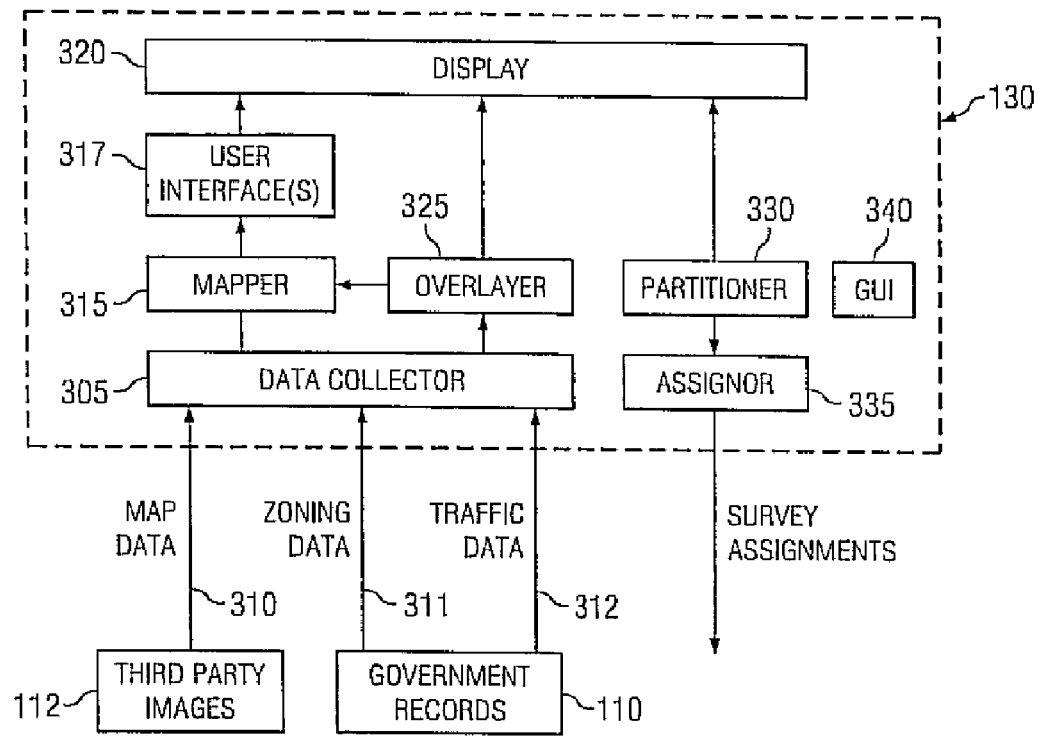
FIG. 3 is a block diagram of an example apparatus that may be used to implement an example survey planner of the example media site data collection system of FIG. 1.

FIG. 1 is a block diagram of an example media site data collection system used to collect media site information as described herein. The example media site data collection system 100 collects data from one or more sources to form a database of media site data 105 (e.g., media site data records). Example media sites include any number and/or types of indoor and/or outdoor advertisement sites (e.g., billboards, posters, banners, sides of buildings, walls of bus stops, walls of subway stations, walls of train stations, store name signage, etc.) and/or commercial sites or establishments (e.g., shopping centers, shopping malls, sports arenas, etc.). For each media site, the example media site database 105 includes one or more data records that store, among other things, values that represent the location of the media site (e.g., geo-code location data), values that represent the direction the media site faces, values that represent whether the media site is illuminated, and/or an owner name and owner ID number for that site, if available. An example data structure 200 that may be used to implement the example site database 105 of FIG. 1 is described below in connection with FIG. 2.

Media site data stored in the example site database 105 of FIG. 1 may be used by, for example, outdoor advertisers to measure and/or establish with scientific and verifiable accuracy the reach of their outdoor media sites. For example, in a study to determine consumer exposure to advertisement sites, a study participant and/or respondent carries (or wears) a satellite positioning system (SPS) receiver (not shown) that periodically (e.g., every 4 to 5 seconds) acquires and receives a plurality of signals transmitted by a plurality of SPS satellites and uses the plurality of received signals to calculate a current geographic location (i.e., a position fix) for the respondent and a current time of day. The SPS receiver sequentially stores the result of each position fix (e.g., geocode location data and the time of day and, if desired, the date) for later processing by a computing device (not shown). Example SPS receivers operate in accordance with one or both of the U.S. Global Positioning System (GPS) or the European Galileo System. The computing device correlates and/or compares the stored sequence of position fixes with locations of media sites represented by the site database 105 to determine if one or more of the media sites should be credited as having been exposed to a person (i.e., whether it is reasonable to conclude that the wearer of the monitoring device (i.e., the SPS receiver) was exposed to the one or more media sites). Example systems and methods to determine media site exposure are described in International Publication No. WO 2006/015339, entitled "Methods and Apparatus for Improving the Accuracy and Reach of Electronic Media Exposure Measurement Systems," and filed on Jul. 29, 2005; International Publication No. WO 2006/015188, entitled "Methods and Apparatus for Improving the Accuracy and Reach of Electronic Media Exposure Measurement Systems," and filed on Jul. 29, 2005; and U.S. Patent Publication No. US 2004/0080452, entitled "Satellite Positioning System Enabled Media Measurement System and Method," and filed on Oct. 16, 2003. International Publication No. WO 20061015339, International Publication No. WO 2006/015188, and U.S. Patent Publication No. US 2004/0080452 are hereby incorporated herein by reference in their entireties.

The accuracy of media exposure measurement systems and methods depends upon the accuracy and/or completeness of the media site data stored in the site database 105. For example, if the location of a particular media site stored in the site database 105 is in error, the media site may be credited with exposures that have not actually occurred and/or may not be credited with exposures that have occurred. Accordingly, the example media site data collection system 100 of FIG. 1 is configured to use data from multiple sources to compile media site data that is as complete and as accurate as technically and/or practically feasible. For example, data from a first source (which may not be complete) may be combined with data from a second source (which may not be complete) to create a more complete site database record for a particular media site. In addition, data from a media site source may be verified using data from another source to verify the accuracy of the data from the media site source and/or to modify and/or update the data in the media site source. As described below, data from multiple sources may be combined, verified, modified and/or used in any number of ways.

Example media site data sources include, but are not limited to, government records 110, a mobile assisted survey tool (MAST) 111, third-party still and/or moving images 112 and/or one or more members of a field force 113 (e.g., using the MAST 111). Example government records 110 include site licensing applications, documents and/or records (e.g., conditional use permits, plot plans, building permits, certificates of occupancy, etc.) that may be collected from, for instance, any number and/or type(s) of county and/or city offices responsible for enforcing building and/or zoning rules and/or regulations. Government records 110 may also include media site data from surveys performed by a government agency and/or a government contractor. In the illustrated example, the media site data collection system 100 is configured to be used to manually retrieve data pertaining to media sites from paper copies of the government records 110 and manually enter hie retrieved data into the site database 105 via, for example, a user interface (e.g., provided by a site data merger 120). However, in other example implementations, data from electronic government records 110 could be electronically captured and/or imported into the site database 105.

The example MAST 111 of FIG. 1 is a mobile apparatus that includes an electronic range finder, a camera, an SPS receiver, and a compass such that a user of the MAST 111 can capture and/or record location information, direction-facing information, illumination information, and/or other data for a media site. The captured media site data is downloaded from the example MAST 111 to the example site data merger 120 on an occasional, periodic, and/or real-time basis. The example MAST 111 is used by members of the example field force 113 and can be implemented using 1) a platform that is attached and/or affixed to the top of an automobile, truck, etc., 2) a platform that can be hand-carried, and/or 3) a platform that is attached and/or affixed to a human-powered vehicle or low-speed vehicles (e.g., bicycles, kick scooters, Segway® personal transporters, etc.). Any number and/or type(s) of data transfer device(s), protocol(s) and/or technique(s) can be used to download captured media site data from the MAST 111 to the site data merger 120. For example, the MAST 111 can be attached to the site data merger 120 using a universal serial bus (USB) connection, a Bluetooth® connection, and/or removable storage device drivers executing on the MAST 111 and/or the site data merger 120. While a single MAST 111 is illustrated in FIG. 1, in other example implementations any number and/or types of mobile assisted survey tools could be used to collected media site data. For example, multiple persons each having a MAST 111 could be used to collect media site data for a geographic area. An example manner of implementing the example MAST 111 is described below in connection with FIGS. 5A and 6A-6D.

In the illustrated example of FIG. 1, third-party still and/or moving images 112 (e.g., video images, motion JPEG, etc.) are electronically acquired from any number and/or type(s) of third parties and/or third party tools such as, for example, web sites, Google® Earth mapping service, Microsoft® Virtual Map and/or Pictometry® Electronic Field Study software. In other example implementations, the images 112 may be obtained in paper form and scanned into or otherwise converted to an electronic format suitable for use by the example site data merger 120. In the illustrated example, the example images 112 are provided for use by the site data merger 120 and/or a user of the site data merger 120 to verify and/or modify media site information and/or data collected by the example MAST 111. The example images 112 may be any type(s) of images including, for example, photographs (e.g., satellite photographs, aerial photographs, terrestrial photographs, etc.), illustrations and/or computer-generated images.

The example field force 113 of FIG. 1 includes one or more persons that physically survey a designated market area (DMA). Such persons may be directly employed by a company operating, utilizing and/or implementing the site database 105, and/or may include contractors hired by the company. In the illustrated example, members of the example field force 113 visit media sites to collect media site data using the example MAST 111 or an apparatus substantially similar to the MAST 111, which may be a pedestrian-based MAST or a vehicular-based MAST. In other example implementations, the members of the field force 113 can use any automated, electronic and/or manual tools and/or methods other than the MAST 111 to collect the media site data.

To merge and/or collect data from one or more of the data sources 110-113, the example media site data collection system 100 includes the site data merger 120. The example site data merger 120 receives data from (and/or inputs based upon) one or more of the media site data sources 110-113 to form the media site data stored in the example site database 105. In the illustrated example, the site data merger 120 is configured to provide one or more user interfaces that allow users to 1) input media site data collected from government records 110, 2) import data from the example MAST 111, and/or 3) overlay media site data (e.g., collected using the MAST 111 and/or collected from other sources such as the government records 110) on top of one or more of the example images 112. Example implementations of user interfaces to allow a user to overlay the media site data on top of one or more of the example images 112 are described below in connection with FIGS. 8A-8C and 10. In the illustrated example, the user interfaces are implemented using the Google® Earth mapping service tool. In other example implementations, any other mapping tool may alternatively be used including, for example, Pictometry® Electronic Field Study software or Microsoft® Virtual Earth. In the illustrated examples, the user interfaces of FIGS. 8A-8C and 10 also enable a user to verify the accuracy of collected media site data and, if necessary, modify and/or correct the media site data based upon the images 112.

While the media site data collection system 100 is described herein as having a single site data merger 120 as illustrated in FIG. 1, in other example implementations, the media site data collection system 100 can be implemented using two or more site data mergers 120 using two or more computing platforms that operate and/or interact with the example site database 105. For example, a first site data merger can be used to enter media site data collected from the government records 110, a second site data merger can be used to import media site data collected using the MAST 111, and a third site data merger can be used to display, verify and/or modify collected media site data using, for example, the third-party images 112.

To partition a DMA for surveying (e.g., using the MAST 111), the example media site data collection system 100 includes a survey planner 130. A detailed block diagram of an example implementation of the survey planner 130 is described below in connection with FIG. 3. The example survey planner 130 uses data from the example government records 110 and/or the example images 112 to categorize different geographic areas as dense areas or sparse areas (e.g., dispersed areas). In addition, the planner can exclude areas in which zoning prohibits outdoor advertising. In the illustrated examples described herein, the geographic areas are categorized in this manner to determine how they will be surveyed. For example, areas designated as dense areas are surveyed by pedestrian surveyors using pedestrian-based MAST's and areas designated as sparse areas are surveyed by vehicular surveyors using vehicular-based MAST's. Pedestrian-based MAST's or similar MAST's may be used by members of the field force 113 that move by walking, riding a bike, or using any other transport equipment (e.g., a Segway®, a kick scooter, etc.) that is relatively more maneuverable in a dense area than a vehicle and more appropriate for use in a pedestrian environment (e.g., sidewalks, walkways, bike paths, etc.). Vehicular-based MAST's are mounted on motorized vehicles (e.g., automobiles, cars, trucks, etc.).

Dense areas are areas characteristic of having relatively more media sites for a given measured area than sparse areas. Dense areas may also be areas having relatively more activity (e.g., high traffic count) and/or which are relatively more densely populated with people, structures, advertisements, etc. than sparse areas such that using a vehicular-based MAST would be difficult or impossible. For example, dense areas may include inner-city neighborhoods or business districts, shopping districts, indoor areas of commercial establishments, etc. The dense areas are surveyed using pedestrian-based MAST's because pedestrians are relatively more agile and flexible for maneuvering and positioning cameras in a densely populated or activity-rich area than are vehicles. Sparse areas are areas characteristic of having relatively less media sites per a given measured area. Sparse areas may also be areas characteristic of having relatively less activity (e.g., low traffic count) and/or which are relatively less densely populated with people, structures, advertisements, etc. than dense areas. For example, sparse areas may include rural roads, highway areas, etc. The sparse areas are surveyed using vehicular-based MAST's because vehicles can cover larger geographic areas faster than pedestrians. In some example implementations, geographic areas that might otherwise be categorized as sparse areas, may nonetheless by surveyed using pedestrian-based MAST's if, for example, characteristics (e.g., traffic, low speed limit, etc.) make it difficult for an automobile to be maneuvered while the MAST 111 is operated and/or the speed at which the traffic is moving might limit the effectiveness of the MAST 111.

In the illustrated example, the example survey planner 130 of FIG. 1 is configured to present a user interface (e.g., the user interface 400 of FIG. 4) that has zoning and traffic count data overlaid on top of a map and/or image of a geographic area. In the illustrated examples described herein, a traffic count is a count of all movements for cars, trucks, buses and/or pedestrians per geographic area for a given duration. The areas that are, for example, zoned for commercial and/or retail use and have high traffic counts are designated as dense areas. Once dense areas and sparse areas are identified, they can be sub-divided and/or assigned to particular members of the field force 113 for surveying. As discussed above, members of the field force 113 assigned to survey sparse areas will do so using vehicle-based MAST's (e.g., the MAST 111 of FIGS. 6A-6D), and members of the field force 113 assigned to survey dense areas will do so using pedestrian-based MAST's.

FIG. 2 illustrates an example data structure 200 that may be used to implement a media site data record of the example site database 105 of FIG. 1 for a media site. To identify the media site, the example data structure 200 includes a panel identifier field 204. The example panel identifier field 204 of FIG. 2 includes a value and/or alphanumeric string that uniquely identifies the media site and is used to associate the media site with a DMA. To identify an owner of the media site (e.g., the owner of an advertisement at the media site), the example data structure 200 includes an owner name field 208. The example owner name field 208 includes an alphanumeric string that represents the owner of the media site. To indicate whether the media site is along a roadway, the example data structure 200 includes an on-road field 212. The example on-road field 212 includes a flag that can have one of two values (e.g., YES or NO) that represents whether the media site is along a roadway. To identify a primary road that the media site is along (if any), the example data structure 200 includes a primary road field 216. The example primary road field 216 includes an alphanumeric string that represents the name of a road. If the media site is not along a road (e.g., the on-road field 212 contains a NO flag value), the primary road field 216 may be left blank. To identify a nearest crossroad (if any), the example data structure 200 includes a cross street field 220. The example cross street field 220 includes an alphanumeric string that represents the name of the nearest crossroad to the media site. If the media site is not along a road (e.g., the on-road field 212 contains a NO flag value), the cross street field 220 may be left blank.

To specify the direction towards which the media site is facing, the example data structure 200 includes a direction facing field 224. The example direction facing field 224 includes a value that represents the direction towards which the media site is facing (e.g., a number in degrees). In the illustrated examples described herein, the example media site data collection system 100 of FIG. 1 determines the media site facing direction relative to true North (e.g., calculated from the geographic offset from magnetic North). The direction towards which a media site is facing can be calculated using a line drawn perpendicular to the face of the media site and outwards or away from the media site.

To specify the location of the media site, the example data structure 200 includes a GPS North-South coordinate field 228 and a GPS East-West coordinate field 232. The example North-South coordinate field 228 contains a value that represents the North-South location of the media site as determined from received GPS signals (i.e., the latitude of the media site). The example East-West coordinate field 232 contains a value that represents the East-West location of the media site as determined from received GPS signals (i.e., the longitude of the media site).

To specify the potential error in the GPS position fix represented by the coordinate fields 228 and 232, the example data structure 200 includes an estimated position error field 236. The example estimated position error field 236 includes a value that represents the potential error in the coordinates represented by the example coordinate fields 228 and 232 (e.g., in units of feet or degrees). The value stored in the estimated position error field 236 may be computed using any algorithm(s), logic and/or method(s) based on, for example, the number and/or strength of received UPS signals. For example, if a GPS position fix was determined using relatively few UPS signals or GPS signals with low signal strength, the error in location may be larger.

To specify on which side of a road the media site is located (if any), the example data structure 200 includes a side of road field 240. The example side of road field 240 includes a flag that represents on which side of the primary road the media site is located. If the media site is not along a road (e.g., the on-road field 212 contains a NO flag value), the side of road field 240 may be left blank. To specify the angle of the media site relative to a road (if any), the example data structure 200 includes an angle to road field 244. The example angle to road field 244 includes a value that represents (e.g., in degrees) the angle the media site faces relative to the road. If the media site is not along a road (e.g., the on-road field 212 contains a NO flag value), the angle to road field 244 may be left blank.

To specify whether the media site is illuminated, the example data structure 200 includes an illumination field 248. The example illumination field 248 includes a value that represents the number of hours per day that the media site is illuminated (e.g., 0 hours, 12 hours, 18 hours, 24 hours, etc.). To specify the type of the media site, the example data structure 200 includes a panel type field 252. The example panel type field 252 includes a value and/or an alphanumeric string that represents a media site type (e.g., a billboard type, a bus-shelter type, an 8-sheet poster type, a 30-sheet poster type, a wall-mural type, a 3-D prop type, etc.). To specify the size of the media site, the example data structure 200 includes a panel size field 256. The example panel size field 256 includes a value that represents the size of the media site measured vertically, horizontally and/or diagonally (e.g., 6 feet, 24 feet, etc.). To specify the distance of the media site from a road (if any), the example data structure 200 includes a distance from road field 260. The example distance from road field 260 includes a value that represents the distance of the media site from the primary road (e.g., in feet or meters). If the media site is not along a road (e.g., the on-road field 212 contains a NO flag value), the distance from road field 260 may be left blank.

To identify the province in which the media site is located, the example data structure 200 includes a province name field 264. The example province name field 264 includes an alphanumeric string that represents the name of the district, county, parish or province in which the media site is located. To identify the city in which the media site is located, the example data structure 200 includes a city name field 268. The example city name field 268 includes an alphanumeric string that represents the name of the city in which the media site is located. To identify a secondary road from which the media site can be viewed (if any), the example data structure 200 includes a secondary road field 272. The example secondary road field 272 includes an alphanumeric string that represents the name of the secondary road from which the media site is visible. If the media site is not visible to any secondary roads, the secondary road field 272 may be left blank. To identify the postal area in which the media site is located, the example data structure 200 includes a postal code field 276. The example postal code field 276 includes an alphanumeric string that represents the postal code (e.g., a zipcode) for the geographic area in which the media site is located.

To identify any obstructions of the media site, the example data structure 200 includes a clutter field 280. The example clutter field 280 includes one or more alphanumeric strings that describe any obstructions that may impact viewing of the media site from the primary road for the media site. The obstructions can be evident from a digital image of the media site stored in association with the data structure 200 (e.g., as specified in a picture field 284). To identify a picture taken of the media site, the example data structure 200 includes a picture field 284. The example picture field 284 includes one or more alphanumeric strings that represent the name of one or more digital image files. Additionally or alternatively, the contents of one or more digital image files may be stored directly within the picture field 284.

While the example data structure 200 is illustrated in FIG. 2 as having the data fields described above, in other example implementations, the example data structure 200 may be implemented using any number and/or type(s) of other and/or additional fields and/or data. Further, the fields and/or data illustrated in FIG. 2 may be combined, divided, omitted, re-arranged, eliminated and/or implemented in any of a variety of ways. For example, the secondary road field 272, the example postal code field 276 and/or the example clutter field 280 may be omitted from some implementations of the site database 105 and/or for some media sites. Moreover, the example data structure may include additional fields and/or data than those illustrated in FIG. 2 and/or may include more than one of any or all of the illustrated fields and/or data.

FIG. 3 is a block diagram of the example survey planner 130 of FIG. 1. To collect data for use in planning surveys of media sites, the example survey planner 130 includes a data collector 305. The example data collector 305 collects map data and/or images 310 from the example third-party images 112 (FIG. 1) and zoning data 311 and traffic data 312 from the example government records 110 (FIG. 1). The map data 310, the zoning data 311 and the traffic data 312 may be collected electronically, manually from paper records, and/or any combination thereof. If any of the map data 310, the zoning data 311 and/or the traffic data 312 is entered manually, the data collector 305 can implement any type of user interface suitable for entering such information. Additionally or alternatively, if such map data 310, zoning data 311 and/or traffic data 312 has already been entered via the example site data merger 120, the data collector 305 can collect any or all of the data 310-312 from the site data merger 120 and/or the example site database 105.

To display the map data 310 collected by the example data collector 305, the example survey planner 130 includes a mapper 315 and a display 320. The example mapper 315 formats and/or creates one or more user interfaces 317 to graphically depict a map and/or image of a geographic area. An example user interface 317 created by the mapper 315 is discussed below in connection with FIG. 4. The example display 320 is configured to display the user interfaces 317 created by the example mapper 315. The example display 320 may be any type of hardware, software and/or any combination thereof that can display a user interface 317 for viewing by a user. For example, the display 320 may include a device driver, a video chipset, and/or a video and/or computer display terminal.

To overlay the zoning data 311 and/or the traffic data 312 on top of the user interface 317 created by the mapper 315, the example survey planner 130 of FIG. 3 includes an overlayer 325. The example overlayer 325 overlays the zoning data 311 and/or traffic data 312 on top of the user interface 317 by providing instructions to the example mapper 315 and/or the display 320. The instructions cause the mapper 315 to modify one or more of the user interfaces 317 and/or cause the display 320 to directly overlay the data 311 and 312. For example, the overlayer 325 may use an application programming interface (API) that directs the display 320 to add lines and/or text to a user interface created by the mapper 315.

In some example implementations, the example data collector 305, the example mapper 315, the example user interface(s) 317, the example display 320 and the example overlayer 325 may be implemented to use the Google® Earth mapping service tool. In other example implementations, other mapping tools such as, for example, Microsoft® Virtual Map or Pictometry® Electronic Field Study software could be used instead. In the illustrated examples described herein, the Google® Earth mapping service tool is used to implement an application that may be executed by a general-purpose computing platform (e.g., the example computing platform 1700 of FIG. 17). In such implementations, portions of the example data collector 305, the example mapper 315, the example user interfaces 317 and the example overlay 325 are implemented using the Google® Earth mapping service application. In particular, the Google® Earth mapping service application collects and displays map data 310 from third-party images 112 (e.g., satellite and/or aerial images of a geographic area) stored within a server that implements and/or provides the Google® Earth mapping service interface 317. The Google® Earth mapping service tool generates user interfaces 317 that may be displayed on a computer terminal associated with the computing platform. Another application and/or utility (i.e., the overlayer 325) that may be executed by the computing platform (and/or a different computing platform) formats the zoning data 311 and the traffic data 312 into a data file suitable for use with the Google® Earth mapping service application (e.g., a file structure in accordance with the Keyhole Markup Language (KML) format). Google® Earth mapping service KML files textually describe lines, information, graphics and/or icons to be displayed by overlaying them on third-party images 112. The Google® Earth mapping service application reads and/or processes the KML file generated by the overlayer 325, and the user's personal computer and/or workstation displays the resulting overlaid images and/or user interfaces 317 generated by the Google® Earth mapping service application for viewing by a user.

To partition portions of a geographic area (e.g., a DMA), the example survey planner 130 of FIG. 3 includes a partitioner 330. The example partitioner 330 of FIG. 3 partitions the map into areas dense in media sites and areas sparse in media sites. The example partitioner 330 partitions the map based upon overlaid zoning data 311 and overlaid traffic data 312. For example, the partitioner 330 identifies portions of the map corresponding to both high traffic counts and zoned for commercial and/or retail use as media site dense areas. Such media site dense areas are typically easiest to survey via, for example, foot and/or bicycle. Other areas of the map are typically sparse in media sites and, thus, amenable to survey via automobile. The partitioning of the overlaid map may be performed via hardware, software, manually and/or via any combination thereof.

To assign geographic areas to surveyors, the example survey planner 130 includes an assignor 335. The example assignor 335 sub-divides the map partitions determined by the example partitioner 330 into sub-partitions based upon the type of the map partition (e.g., dense or sparse) and based upon the size of a geographic area that can be surveyed by a surveyor within a prescribed time period (e.g., miles of roadway per day). For example, a surveyor on foot may be able to survey two miles of densely located media sites in a day, while a surveyor in a car may be able to survey 20 miles of dispersedly located media sites in a day. The example assignor 335 then assigns the sub-partitions to particular surveyors so that an entire geographic area is surveyed, for example, in as time efficient a manner as possible (e.g., in as few days as possible given a particular number and/or type(s) of surveyors) and/or in as cost efficient a manner as possible. The creation of sub-partitions and/or the assignment of sub-partitions to surveyors may be performed via hardware, software, manually and/or as any combinations thereof.

To control the example survey planner 130 of FIG. 3, the survey planner 130 includes a graphical user interface (GUI) 340. The example GUI 340 may be part of an operating system (e.g., Microsoft® Windows XP®) used to implement the survey planner 130. The GUI 340 allows a user of the survey planner 130 to, for example, select a geographic area to be mapped and/or to select zoning data 311 and/or traffic data 312 to be overlaid on the geographic area map. If the Google® Earth mapping service tool is used to implement a portion of the example survey planner 130, the GUI 340 provides an interface between the user and the Google® Earth mapping service application. For example, the Google® Earth mapping service tool may use an API provided by the example GUI 340 to display information and/or to receive user inputs and/or selections (e.g., to allow a user to select a KML file to load).

While an example manner of implementing the example survey planner 130 of FIG. 1 has been illustrated in FIG. 3, some of the elements, processes and devices illustrated in FIG. 3 may be combined, divided, re-arranged, omitted, eliminated and/or implemented in any of a variety of ways. Further, the example data collector 305, the example mapper 315, the example user interface(s) 317, the example display 320, the example overlayer 325, the example partitioner 330, the example assignor 335, the example GUI 340 and/or, more generally, the example survey planner 130 may be implemented using hardware, software, firmware and/or any combination of hardware, software and/or firmware. Further still, the example survey planner 130 may include additional elements, processes and/or devices than those illustrated in FIG. 3 and/or may include more than one of any or all of the illustrated elements, processes and/or devices.

Figure 4:
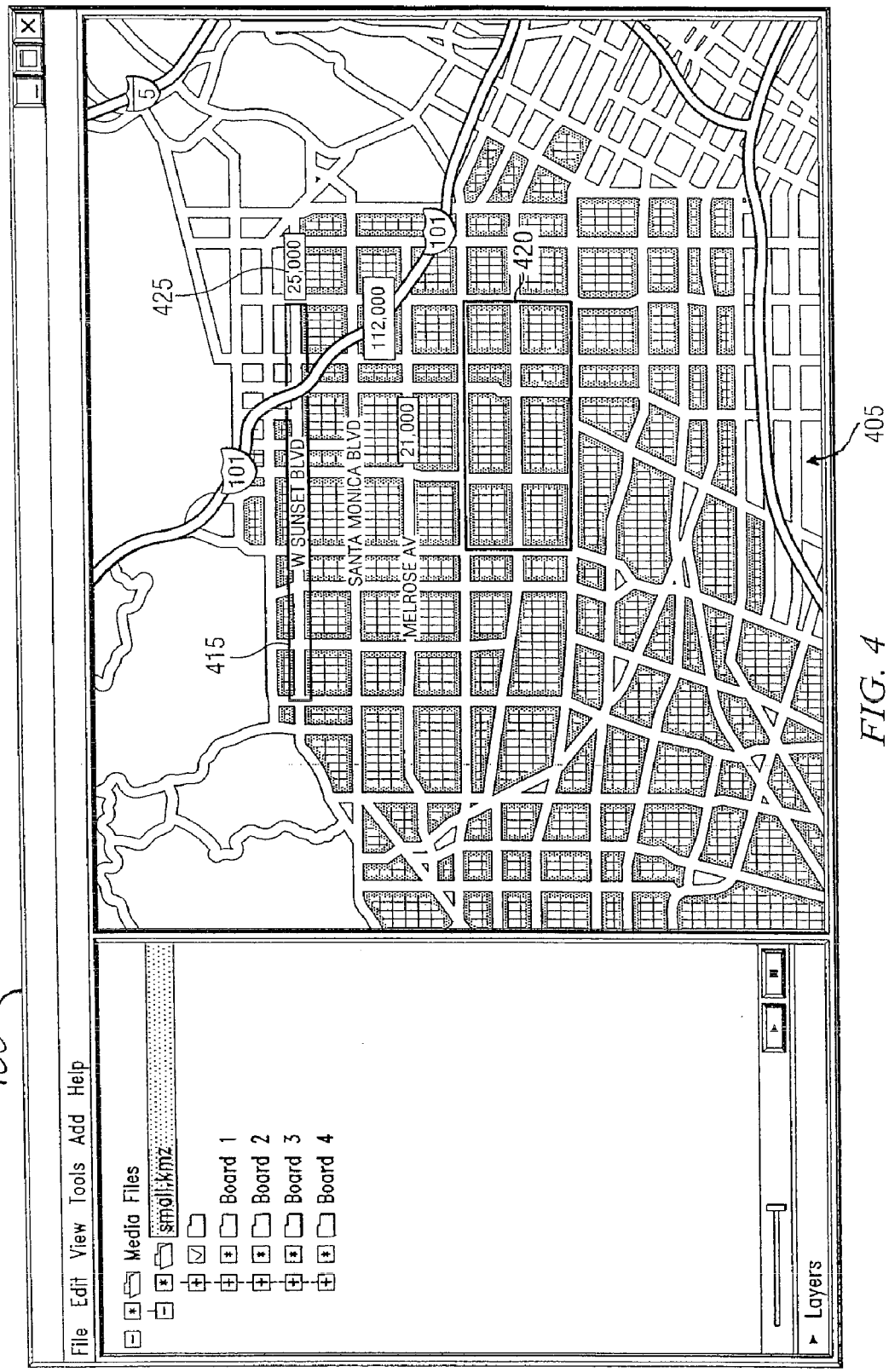
FIG. 4 is an example graphical user interface display that may be used to implement a display of the survey planner of FIGS. 1 and 3.

FIG. 4 illustrates an example user interface 400 that may be presented by the example survey planner 130 of FIGS. 1 and 3. In the illustrated example, the user interface 400 is one of the user interfaces 317 of the survey planner 130 depicted in FIG. 3. The user interface 400 may be created using any mapping tool, such as a geographic information system (GIS) tool (e.g., a MapInfo® GIS tool) or the Google® Earth mapping service. To depict a geographic area, the example user interface 400 includes a map and/or image 405 of the geographic area.

To depict the zoning of different portions of the geographic area, the example map 405 is color-coded based upon how an area is zoned. For example, an area 415 occurring along West Sunset Boulevard is zoned for commercial use while an area 420 south of Melrose Avenue is zoned for residential use. To depict traffic data, the example map 405 is overlaid with traffic count data. For example, a traffic count 425 for West Sunset Boulevard is 25,000 per the 2003 Annual Average Weekday Traffic (AAWT) Traffic Count for Los Angeles County.

As discussed above in connection with FIG. 3, areas that are likely to be dense in media sites can be identified based upon having a high traffic count and/or being zoned for commercial and/or retail use. Example dense media site areas of FIG. 4 occur along West Sunset Boulevard, Santa Monica Boulevard and Melrose Avenue. An example sparse media site area 420 is located south of Melrose Avenue.

Figure 5A:
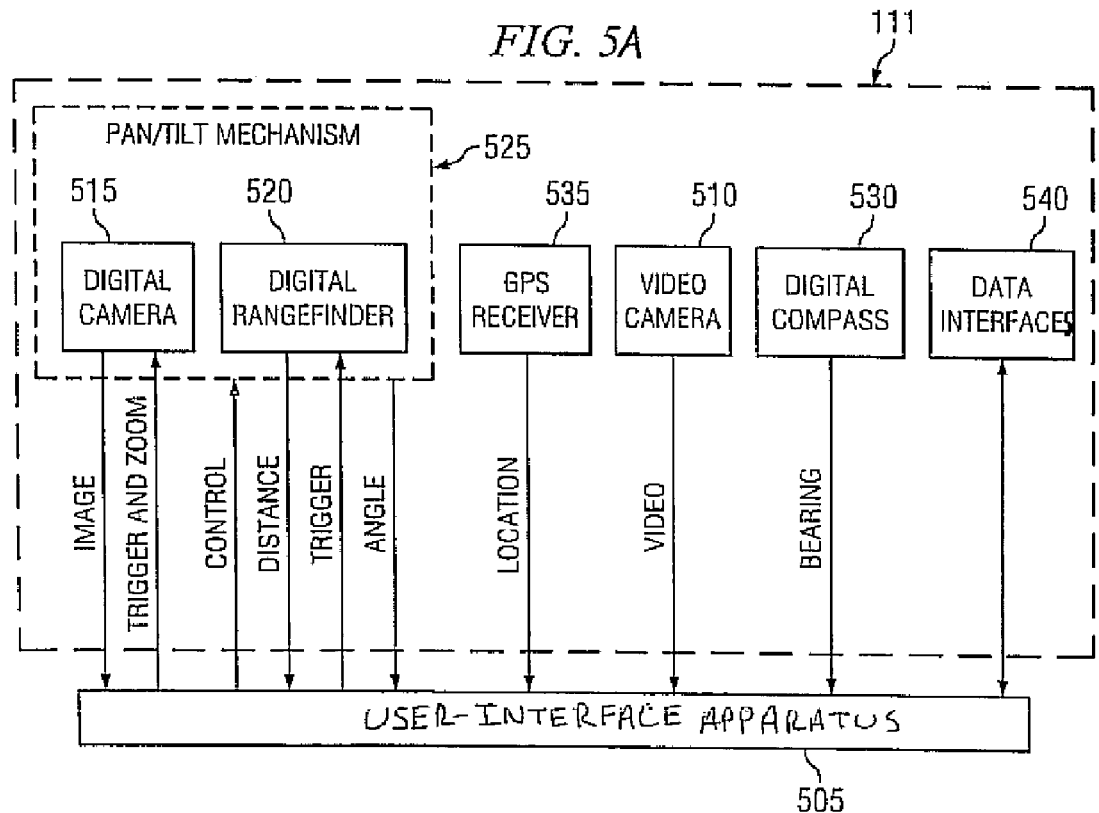
FIG. 5A depicts a block diagram of an example apparatus that may be used to implement an example mobile assisted survey tool of the example media site data collection system of FIG. 1.

FIG. 5A is a block diagram of the example mobile assisted survey tool (MAST) 111 of FIG. 1. To control the example MAST 111, the MAST 111 includes a user-interface apparatus 505, which may be implemented using, for example, a touch-screen tablet computer, a hand-held computer, a personal digital assistant (PDA) and/or a laptop computer. The example user-interface apparatus 505 provides a user interface (such as a GUI) that allows a user of the user-interface apparatus 505 to control the operation of the MAST 111 to collect and/or enter media site data. The example user-interface apparatus 505 displays real-time video on a user interface (e.g., in a window of an application executing upon the user-interface apparatus 505) that enables a user to touch a point (e.g., a location) on the screen of the user-interface apparatus 505 to identify a media site. Upon receipt of such a user-provided media site selection, the example user-interface apparatus 505 interacts with other elements of the MAST 111 to capture media site data as described below. In some example implementations such as, for example, in some pedestrian-based MAST systems, the video camera 510 may be omitted from the MAST 111, and surveyors (e.g., members of the field force 113) can rely on their own sight to determine the direction in which to direct the field of view of the digital camera 515 to capture an image of a targeted media site. The user-interface apparatus 505 also provides one or more additional and/or alternative user interfaces that allow a user of the user-interface apparatus 505 to enter textual information concerning the media site. Example textual information includes, media site owner, primary road, secondary road, crossroads, illumination, etc.

To capture real-time video, the example MAST 111 includes a video camera 510 (e.g., a video image capturing device). The example video camera 510 is any type and/or model of digital video camera capable of capturing, storing and/or providing real-time video to the example user-interface apparatus 505. In the illustrated examples described herein, the Live! Ultra webcam manufactured by Creative Labs® is used to implement the example video camera 510 and is coupled to the example user-interface apparatus 505 via a Universal Serial Bus (USB) interface to enable live video feed to be communicated to and displayed by the user-interface apparatus 505. In other example implementations, other peripheral interfaces such as, for example, a Bluetooth® interface, an IEEE 1394 interface, a coaxial cable interface, etc. may be used instead to couple the video camera 510 to the user-interface apparatus 505.

To capture a still image of a selected media site, the example MAST 111 of FIG. 5A includes a camera 515 (e.g., a still image capturing device). The example camera 515 may be implemented using any type and/or model of digital still picture camera capable of capturing, storing and/or providing a digital photograph to the example user-interface apparatus 505 and being controlled by the user-interface apparatus 505. In the example implementation of FIG. 5A, the digital camera 515 is capable of capturing relatively higher resolution images and/or relatively higher quality images (e.g., higher color depth, sharper images, better focused images, etc.) than the video camera 510. In this manner, the higher-resolution images of the media sites facilitate subsequently performing detailed analyses of text and image details of the media sites. In the illustrated example, the S3iS digital camera manufactured by Canon® of Shimomaruko 3-chome, Ohta-ku, Tokyo, Japan is used to implement the example digital camera 510.

In the illustrated example, the example digital camera 515 is coupled to the example user-interface apparatus 505 using a USB interface. In other example implementations, other peripheral interfaces such as, for example, a Bluetooth® interface, an IEEE 1394 interface, etc. may be used instead to couple the camera 515 to the user-interface apparatus 505. The digital camera 515 is controlled by the example user-interface apparatus 505 to, for example, control the zoom of the digital camera 515 and/or the shutter trigger of the digital camera 515 to capture a photograph. Although the example MAST 111 is described herein as having separate video and still picture cameras (e.g., the video camera 510 and the digital camera 515), in other example implementations, the MAST 111 may be implemented using a single camera capable of capturing video and digital still pictures. In this manner, the camera can transfer live video to the user-interface apparatus 505 and, when a user selects an advertisement object of interest in the video feed to be captured, the computer can control the camera to capture a still image (e.g., a high-resolution still image) of the specified object.

To determine the distance to a selected media site, the example MAST 111 of FIG. 5A includes a rangefinder 520. The example rangefinder 520 can be implemented using any type and/or model of digital rangefinder. In the illustrated examples described herein, the rangefinder 520 is implemented using the TruPulse® 200B manufactured by Laser Technologies of 7070 S. Tucson Way, Englewood, Colo., USA, 80112. In the illustrated example, the rangefinder 520 is coupled to the user-interface apparatus 505 using a Bluetooth® interface. In other example implementations, other peripheral interfaces such as, for example, an RS-232 serial communication interface, an IEEE 1394 interface, a USB interface etc. may be used instead. In the illustrated example, the rangefinder 520 is controlled by the example user-interface apparatus 505 to measure and report the distance between the rangefinder 520 and a media site. In the example of FIG. 5A, the digital camera 515 is triggered to take a picture of the media site at substantially the same time that the digital rangefinder 520 is triggered to measure the distance to the media site.

To position the digital camera 515 and the digital rangefinder 520, the example MAST 111 includes a pan-tilt mechanism 525. The example pan-tilt mechanism 525 is controllable in two directions (side-to-side and up-and-down) to orient the camera 515 and the rangefinder 520 relative to a media site. For example, the pan-tilt mechanism 525 can be controlled so that the selected media site is in substantially the center of a viewfinder of the digital camera 515 and/or a picture captured by the digital camera 515. The pan-tilt mechanism 525 may be controlled manually by a user of the MAST 111 and/or automatically by the user-interface apparatus 505 based upon a user-selected point in the real-time video provided to the user-interface apparatus 505 by the example video camera 510. For example, the user-interface apparatus 505 may determine that a selected media site is currently displayed in the upper right corner of the real-time video and, thus, direct the pan-tilt mechanism 525 to rotate to the right and tilt upwards until the media site is in the middle of the real-time video frames. The example pan-tilt mechanism 525 may be coupled to the example user-interface apparatus 505 using any type of interface, such as an RS-232 serial communication interface, a USB interface and/or a Bluetooth Interface. The interface may be used to control the pan-tilt mechanism 525 (if electronically controllable) and/or to receive angle and/or tilt information from the pan-tilt mechanism 525. Such angle and/or tilt information is relative to the current orientation of the MAST 111 (e.g., the facing direction of an automobile to which the MAST 111 is mounted). A pan-tilt mechanism that can be used to implement the example pan/tile mechanism 525 is implemented using the SPG400 Standard Servo Power Gearbox, the SPT400 Standard Servo Power Gearbox Tilt System, the 31425S HS-425BB Servo and the 356455 HS-5645MG Servo—all manufactured by Servo City of 620 Industrial Park, Winfield, Kans., USA, 67156.

To determine the directions in which the fields of view of the cameras 510 aid 515 are positioned, the example MAST 111 includes a digital compass 530. The example compass 530 may be implemented using any type and/or model of digital compass. The example compass 530 may be coupled to the example user-interface apparatus 505 using any type of interface including, for example, a USB interface and/or a Bluetooth® Interface. The USB interface may be used to read the current orientation of the MAST 111 in, for example, degrees. As described below in connection with FIGS. 6A and 6B, the MAST 111 may be provided with a rotary encoder 635 to determine an angle of rotation (or pan) of the cameras 510 and 515 relative to a reference point on a vehicle. In this manner, the user-interface apparatus 505 may determine the directions in which the fields of view of the cameras 510 and 515 are positioned based on a direction of travel of an automobile as indicated by the compass 530 and the angle of rotation indicated by the rotary encoder 635. In other example implementations, the digital compass 530 may be coupled to a rotating (e.g., a panning) platform on which the cameras 510 and 515 are mounted so that as the cameras 510 and 515 are rotated, the compass 510 is also rotated to directly detect the direction in which the fields of view of the cameras 510 and 515 are positioned.

To determine geographic locations of the MAST 111 when the digital camera 515 captures images of media sites, the example MAST 111 includes a GPS receiver 535. In the illustrated example, the example GPS receiver 535 is implemented using an Earthmate® LT-20 GPS receiver communicatively coupled to the user-interface apparatus 505 using a USB interface. The USB interface may be used to obtain the last position fix from the GPS receiver 535 (e.g., longitude and latitude) and/or to direct the GPS receiver 535 to perform a position fix. The GPS receiver 535 may also estimate and provide to the user-interface apparatus 505 an estimate of the amount of error in a position fix. In other example implementations, the GPS receiver 535 may be implemented using any other type and/or model of GPS receiver capable to receive GPS signals from one or more UPS satellites, and determine and/or estimate the current location of the MAST 111. In addition, the example GPS receiver 535 may be coupled to the example user-interface apparatus 505 using any other type of interface including, for example, a Bluetooth® interface.

In the illustrated example of FIG. 5, the data interfaces (e.g., data interface hardware, software, and protocols) are represented using the data interfaces block designated by reference numeral 540. For example, in the illustrated example, the MAST 111 is provided with a USB hub to communicatively couple any USB interfaces of the components described above to the user-interface apparatus 505. Such USB hub, represented by the data interfaces 540, is separate from the other components and may be used if the user-interface apparatus 505 has less USB interfaces than the number required to communicate with the above-described components that use USB interfaces. However, in some example implementations or for some of the above-described components, some of the data interfaces 540 are integrated in the components and the components are directly communicatively coupled to the user-interface apparatus 505. The data interfaces 540 may include, for example, USB interfaces, RS-232 serial communication interfaces, Bluetooth® Interfaces, IEEE 1394 interfaces. As described in detail above, the data interfaces 540 enable the computer to control and exchange data with the above-described components. For instance, the data interfaces 540 enable the example MAST 111 to download media site data to, for example, the example site data merger 120 of FIG. 1 using the example data structure 200 of FIG. 2. Although not shown, the MAST 111 may include any number and/or type(s) of power sources (e.g., batteries, AC power supplies, DC power supplies, etc.) to power the user-interface apparatus 505, the video camera 510, the digital camera 515, the digital rangefinder 520, the pan-tilt mechanism 525, the digital compass 530 and/or the GPS receiver 535.

Figure 5B:
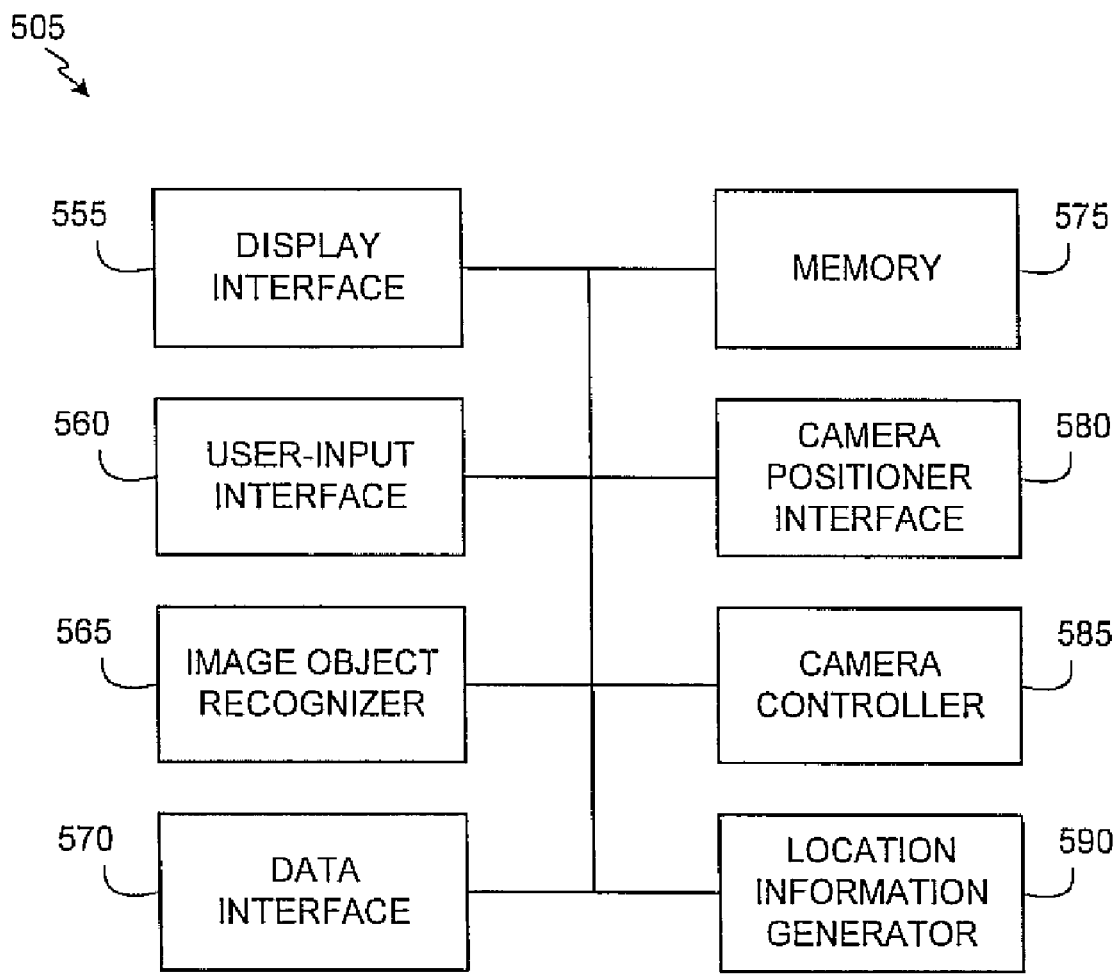
FIG. 5B depicts a block diagram of an example user-interface apparatus of the example mobile assisted survey tool of FIG. 5A.

FIG. 5B is a block diagram of the example user-interface apparatus 505 of the example mobile assisted survey tool 111 of FIG. 5A. To display user interface screens, maps or images of geographic areas, images of scenes having media sites, images of media sites and/or any information related thereto, the example user-interface apparatus 505 is provided with a display interface 555. In the illustrated example, the display interface 555 is implemented using a Microsoft® Windows operating system display interface configured to display graphical user interfaces. To receive user inputs from a user (e.g., a pedestrian surveyor or a vehicular surveyor), the user-interface apparatus 505 is provided with a user-input interface 560. In the illustrated example, the user-input interface 560 is implemented using an interface to a touch panel mounted onto a display of the example user-input apparatus 505. In other example implementations, the user-input interface 560 may be implemented using any other type of user-input interface including a mouse or other pointer device, a keyboard interface, etc.

To recognize or identify objects in images, the user-interface apparatus 505 is provided with an image object recognizer 565. In the illustrated example, the image object recognizer 565 is configured to perform object recognition processes to recognize media sites (e.g., billboards, posters, murals, or any other advertisement media) in images captured by the video camera 510 and/or the digital camera 515. For example, during a survey, when the display interface 555 displays to a user real-time images captured by the video camera 510 of a general area having one or more advertisement media sites and the user uses the user-input interface 560 to select a location on the captured image having one of the media sites, the image object recognizer 565 can use the screen location selected by the user on the displayed image and use an object recognition process to detect the boundaries of an advertisement located in the scene at the user-selected screen location. In this manner, subsequent processes can be performed to aim and zoom the digital camera 515 towards the advertisement media site in the scene.

To store data to and retrieve data from a local memory 575, the user-interface apparatus 505 is provided with a data interface 570. In the illustrated example, the data interface 570 is configured to retrieve and store data in data records (e.g., the data structure 200 of FIG. 2) for different surveyed media sites. For example, the data interface 570 can receive data from the digital camera 515, the digital rangefinder 520, the UPS receiver 535, the video camera 510, the digital compass 530, and/or the data interface 540 described above in connection with FIG. 5A and store the data in the local memory 575. In addition, the data interface 570 is configured to store and retrieve images in the memory 575 captured by the camera(s) 510 and/or 515 for display via the display interface 555. Also, the data interface 570 is configured to retrieve aerial maps or photographs or satellite photographs of geographic areas for display to a user as shown below in connection with the user interface 800 of FIGS. 8A-8C and/or the user interface 1000 of FIG. 10. Also, in the illustrated example, the data interface 570 is configured to store the zoom levels of the digital camera 515 used to capture images of media sites, to store distances between user-specified media sites and survey locations from which the media sites were surveyed, to store captured images of media sites, to store pan and tilt angles used to position the rangefinder 520 and the digital camera 515 to capture the images of the media sites, to store location information representative of the locations of the MAST 111 when the media sites were surveyed and to store timestamp(s) indicative of time(s) at which the digital camera 515 captured the image(s) of the media sites. The information stored in the memory 575 can subsequently be used to determine geographic location coordinates of the media sites and/or can be communicated to the site database 105 for storage and subsequent processing.

To control the position of the digital camera 515 and the rangefinder 520 prior to capturing an image of a user-specified media site, the user-input apparatus 505 is provided with a camera positioner interface 580. In the illustrated example, the camera positioner interface 580 is configured to determine an amount of tilt rotation and pan rotation (e.g., rotational angle values) by which to adjust the position of the digital camera 515 and the rangefinder 520 to position the field of view of the digital camera 515 on a targeted media site. For example, after the image object recognizer 565 recognizes the boundaries of a media site to be surveyed, the camera positioner interface 580 can determine pan and tilt adjustment values with which to adjust the pan-tilt mechanism 525 (FIG. 5A) to position the fields of view of the digital camera 515 and the rangefinder 520 to be on the identified media site.

To control the operation of the video camera 510 and the digital camera 515, the user-interface apparatus 505 is provided with a camera controller 585. In the illustrated example, the camera controller 585 is configured to control the zoom levels and the shutter trigger of the digital camera 515 to capture images of media sites. To control the zoom level, the camera controller 585 is configured to determine the zoom level based on the distance between the digital camera 515 and the targeted media site as measured by the digital rangefinder 520. In the illustrated example, the camera controller 585 is configured to determine zoom levels that capture a media site in its entirety (e.g., advertisement content and fixtures to which the advertisement content is affixed or surrounding the advertisement content) or to capture at least a portion of the media site. The camera controller 585 is also configured to control image or video capture operations including zoom operations of the video camera 510.

To determine location information (e.g., geocodes, geographic coordinates, etc.) for locations of media sites, the example user-interface apparatus 505 is provided with a location information generator 590. In the illustrated example, the location information generator 590 is configured to use data stored in the memory 575 to determine the location(s) of media site(s) as described in detail below in connection with FIG. 16.

Wile example manners of implementing the example MAST 111 of FIG. 1 and the example user-interface apparatus 505 are illustrated in FIG. 5A, the example MAST 111 and the example user-interface apparatus 505 may be implemented using any number and/or type(s) of other and/or additional elements, devices, components, interfaces, circuits and/or processors. Further, the elements, devices, components, interfaces, circuits and/or processors illustrated in FIGS. 5A and 5B may be combined, divided, re-arranged, eliminated and/or implemented in any number of different ways. Additionally, the example MAST 111 and/or the example user-interface apparatus 505 may be implemented using any combination of firmware, software, logic and/or hardware. Moreover, the MAST 111 and/or the example user-interface apparatus 505 may be implemented to include additional elements, devices, components, interfaces, circuits and/or processors than those illustrated in FIGS. 5A and 5B and/or may include more than one of any or all of the illustrated elements, devices, components, interfaces, circuits and/or processors.

FIGS. 6A, 6B, 6C, and 6D illustrate example structural configurations that may be used to implement the example MAST 111 of FIGS. 1 and 5A. While example configurations of implementing the example MAST 111 are illustrated in FIGS. 6A-6D, other configurations of implementing the MAST 111 may alternatively be used. Because many elements, devices, components, interfaces, circuits and/or processors of the example MAST 111 of FIGS. 6A-6D are identical to those discussed above in connection with FIG. 5A, the descriptions of those elements, devices, components, interfaces, circuits and/or processors are not repeated here. Instead, identical elements, devices, components, interfaces, circuits and/or processors are illustrated with identical reference numerals in FIGS. 5A and 6A-6D, and the interested reader is referred back to the descriptions presented above in connection with FIG. 5A for a complete description of those like numbered elements, devices, components, interfaces, circuits and/or processors.

Figure 6A:
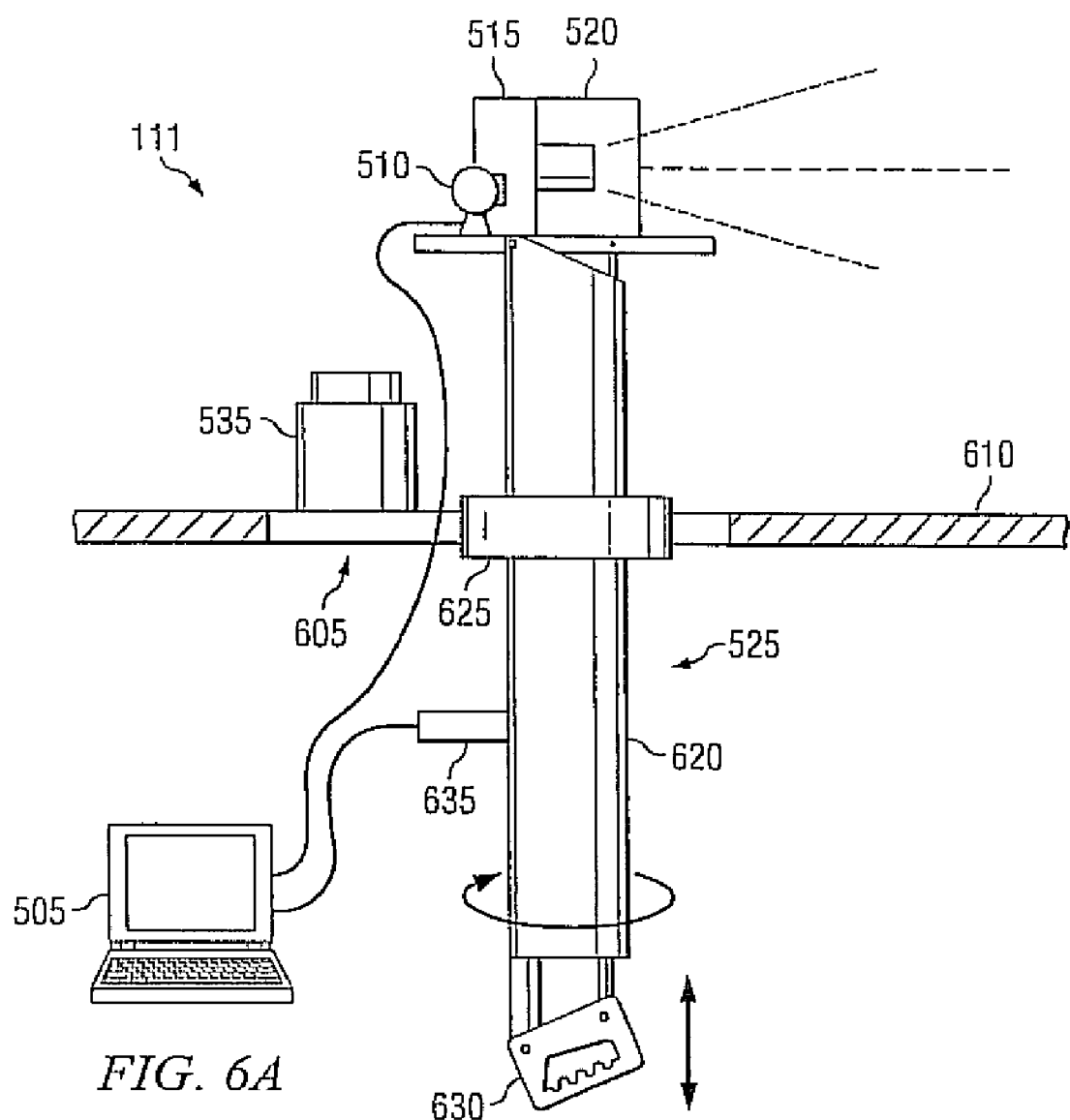
FIGS. 6A, 6B, 6C, and 6D illustrate example structural configurations that may be used to implement the example mobile assisted survey tool of FIGS. 1 and 5A.
Figure 6B:
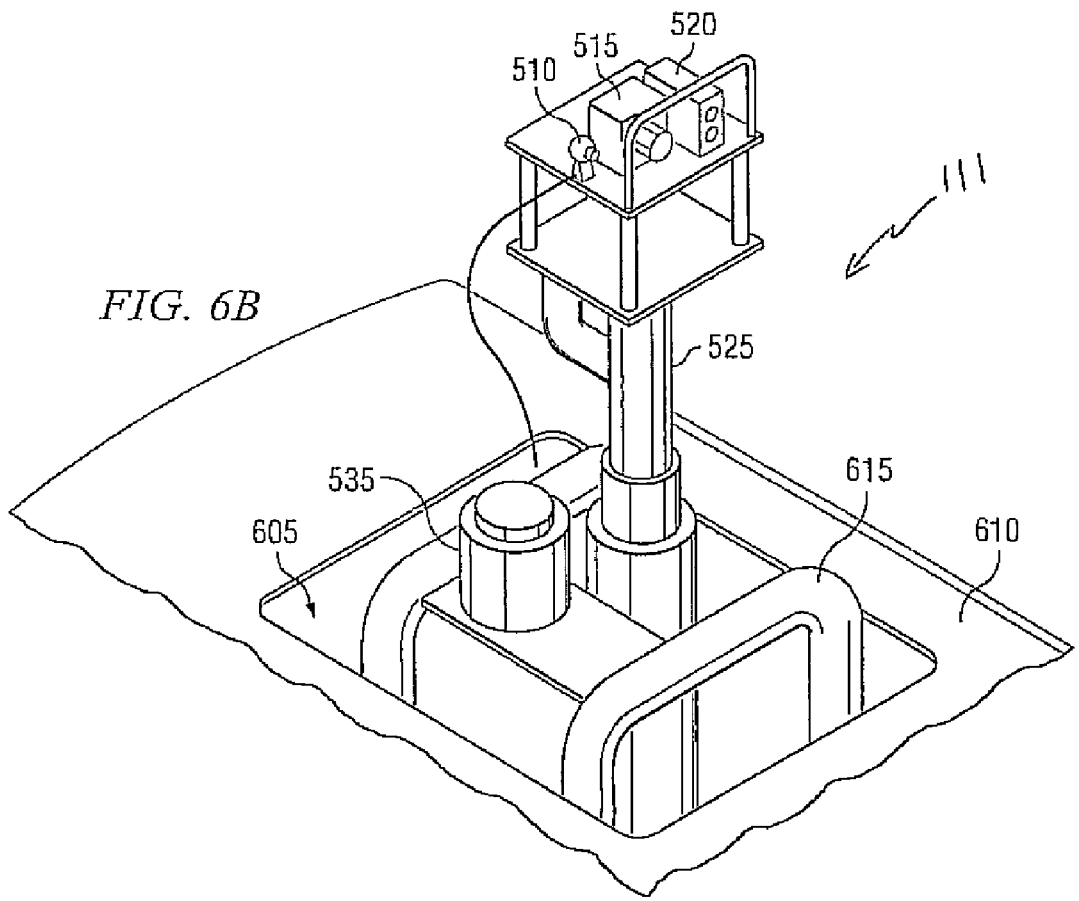

As shown in FIG. 6A, the example MAST 111 is mounted through a sun roof 605 of an automobile roof 610. As shown in FIG. 6B, the MAST 111 is mechanically affixed to one or more members that position and/or secure the MAST 111 within the sun roof area 605. In the illustrated examples of FIGS. 6A and 6B, the pan-tilt mechanism 525 is implemented using a manual adjustment configuration. In particular, as shown in FIG. 6A, the pan-tilt mechanism 525 is implemented using a PVC pipe 620 that passes through a thrust bearing 625 and is manually controllable using an up/down and rotate handle 630. The manual pan-tilt mechanism 525 of FIGS. 6A and 6B enables a person to control the position and field of view of the cameras 510 and 515 and the range finder 520 by enabling the person to a) move the handle 630 upwards/downwards to tilt the video camera 510, the digital camera 515 and the rangefinder 520 relative to a geographic horizon and b) rotate the handle 630 to rotate the video camera 510, the digital camera 515 and the rangefinder 520 relative to the front of the automobile.

In the illustrated example of FIGS. 6A and 6B, the MAST 111 is provided with a rotary encoder 635 to determine the position of the video camera 510, the digital camera 515 and the rangefinder 520 relative to the front-to-back centerline of the automobile. The example rotary encoder 635 provides a digital value and/or an electrical signal representative of the rotational angle of the video camera 510, the digital camera 515 and the rangefinder 520 relative to the front-to-back centerline of the automobile to the user-interface apparatus 505. In this manner, the user-interface apparatus 505 can determine the direction in which fields of view of the cameras 510 and 515 are pointing based on direction information from the digital compass 530 and the angle of rotation indicated by the rotary encoder 635.

Figure 6C:
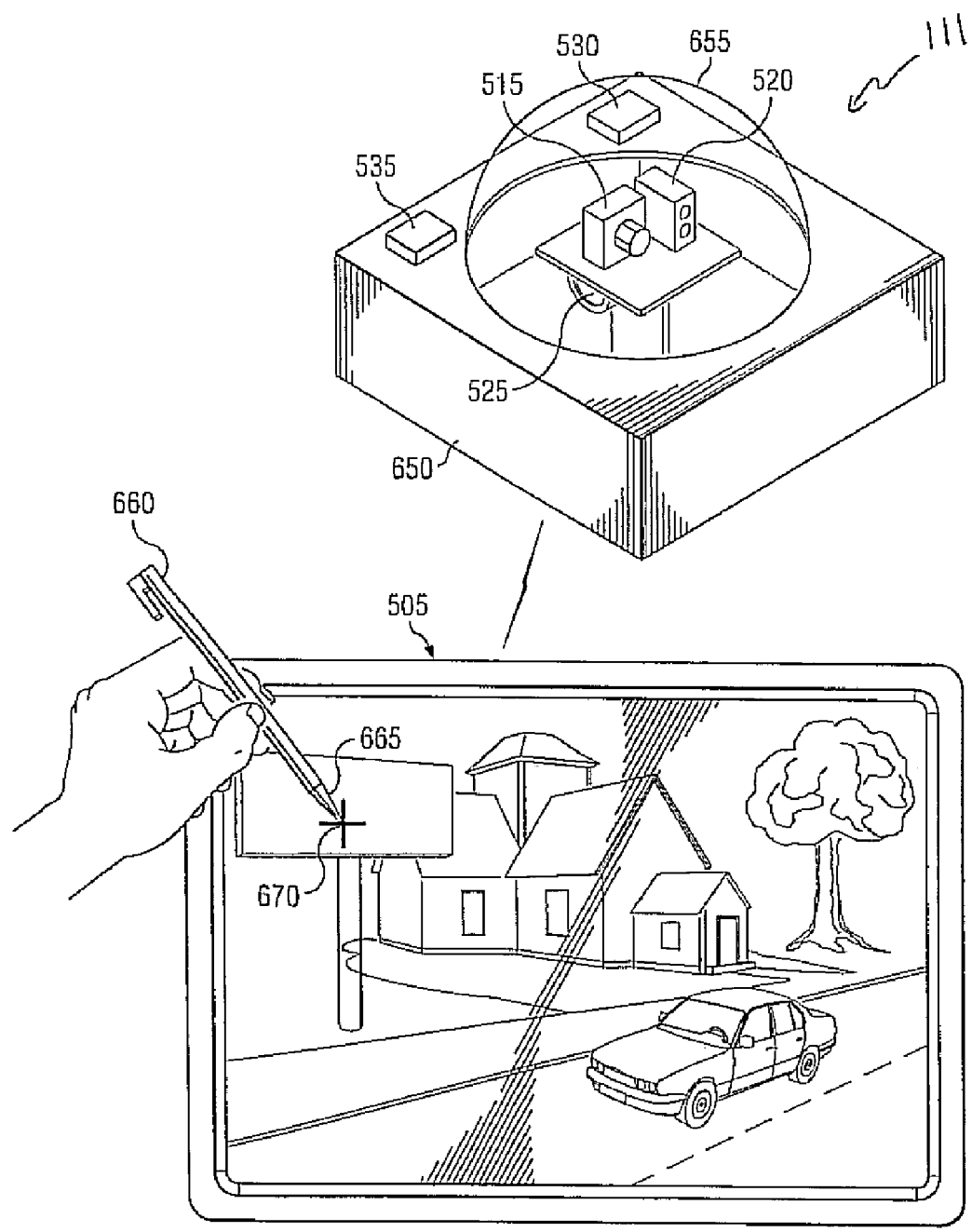

In the illustrated example of FIG. 6C, the example MAST 111 is implemented using an electronically controllable pan-tilt mechanism 525 and is surrounded by an example housing 650 having a clear weatherproof dome 655 to protect the MAST 111 from environmental elements (e.g., rain, snow, wind, etc.). The example housing 650 can be mounted and/or affixed to the top of an automobile using, for example, straps, a luggage rack, a ski rack, a bike rack, suction cups, etc. To allow a user of the example user-interface apparatus 505 of FIG. 6C to select a media site, the example MAST 111 of FIG. 6C includes a stylus 660. The user selects a media site by pressing the tip 665 of the stylus 660 to a touch-panel-enabled screen 670 of the user-interface apparatus 505 at a point corresponding to a media site.

In the illustrated example of FIG. 6C, the pan-tilt mechanism 525 is electronically controllable via the user-interface apparatus 505. In the illustrated example, the example user-interface apparatus 505 communicates with the video camera 510 ((FIGS. 6A and 6B) which is provided but not shown in the example configuration of FIG. 6C), the digital camera 515, the rangefinder 520, the pan-tilt mechanism 525, the digital compass 530 and the GPS receiver 535 via respective communication interfaces as described above in connection with FIG. 5A. In some example implementations, to allow the housing 650 to be water and air tight and/or to reduce cable clutter, the components of the MAST 111 in the housing 650 can be communicatively coupled to the user-interface apparatus 505 via a wireless communication interface such as, for example, a Bluetooth® interface to eliminate the need to extend communication cables from the user-interface apparatus 505 to the MAST components. In some example implementations, the MAST 111 can be provided with a manual pan-tilt adjustment mechanism as shown in FIGS. 6A and 6B to allow a user to perform coarse position adjustments of the MAST 111, and the MAST 111 can also be provided with the electronic pan-tilt mechanism 525 to enable the MAST 111 to automatically perform fine position adjustments when, for example, centering on and zooming into a media site of interest.

Figure 6D:
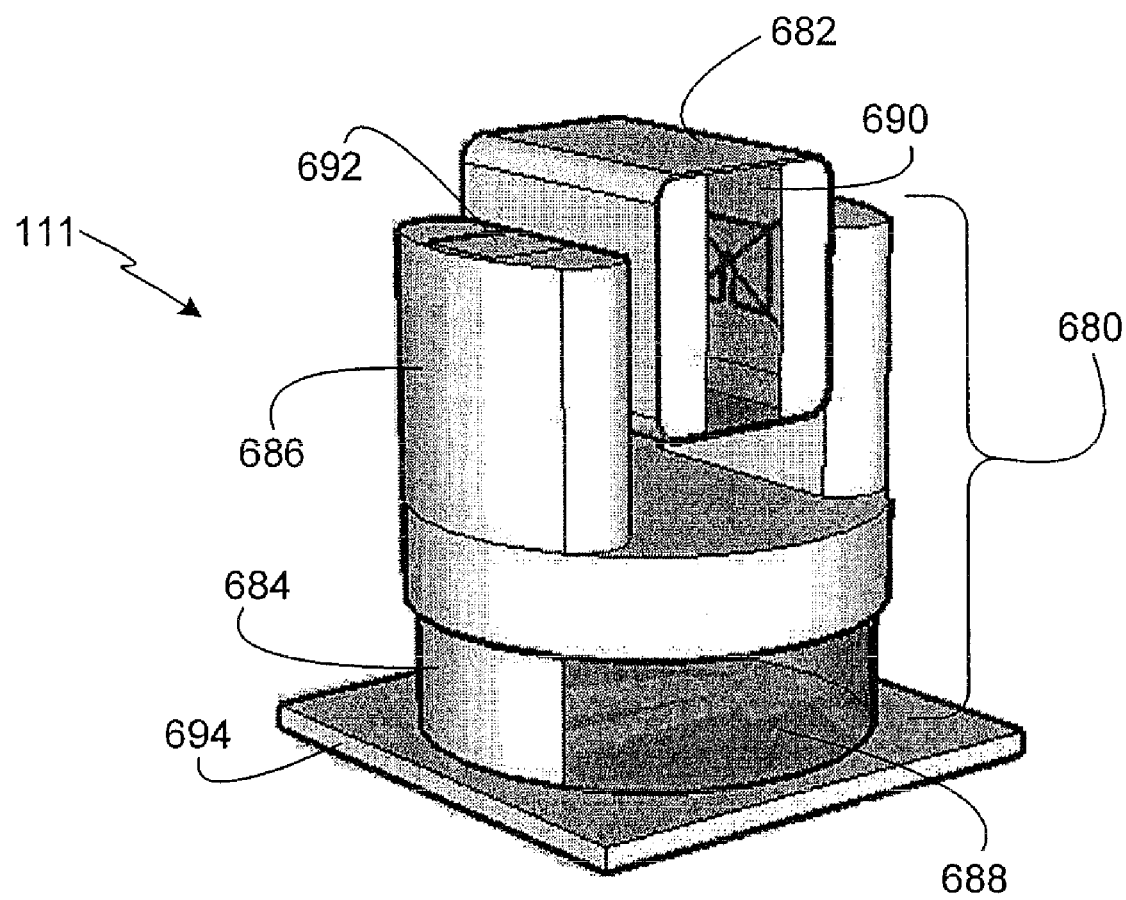

In the illustrated example of FIG. 6D, the example MAST 111 is implemented using a base 680 and a tiltable housing 682 to provide a vertical tilting motion. In the illustrated example of FIG. 6D, the base or housing 680 includes a lower fixed-position base or housing portion 684 and an upper rotatable base or housing portion 686 to provide a panning motion. The video camera 510 (FIGS. 5A, 6A, and 6B) is mounted in the lower fixed-position base portion 684 and captures video images through a window area 688. The digital camera 515 and the rangefinder 520 (FIGS. 5A, 6A, 6B, and 6C) are mounted in the tiltable housing 682 of the upper rotatable base portion 686 and have a field of view or line of sight through a window area 690. In the illustrated example, a tilting device of the pan-tilt mechanism 525 is mounted in the upper rotatable base portion 686 at a location indicated by reference numeral 692 to vertically tilt the tiltable housing 682. To protect the video camera 510, the digital camera 515, and the rangefinder 520 from environmental elements (e.g., rain, snow, wind, etc.), the base 680 including the tiltable housing 682 and the lower and upper base portions 684 and 686 are implemented using weatherproof construction. Although not shown, the digital compass 530 and the GPS receiver 535 can also be mounted on the MAST 111 of FIG. 6D. For example, the digital compass 530 and the GPS receiver 535 can be mounted on a fixed (e.g., non pannable and non tiltable) portion such as, for example, a mounting plate 694 that remains in a fixed position relative to a vehicle on which the MAST 111 is mounted. Although the lower base portion 684 is described above as a fixed-position base portion, in other example implementations, the lower base portion 684 may be implemented as a rotatable base portion so that the lower and upper base portions 684 and 686 can rotate together to enable panning motions for the digital camera 515 and the video camera 510.

While the example MAST 111 of FIGS. 6A, 6B, 6C, and/or 6D has a vehicular-based form factor suitable for mounting on a motorized vehicle, in oilier example implementations the example MAST 111 may be implemented as a pedestrian-based MAST using a wearable and/or carry-able form factor. For example, the rangefinder 520 may be a hand-held rangefinder 520 having a viewfinder that allows a user to point the rangefinder 520 at or about the center of a media site. In the illustrated example, the rangefinder 520 is capable of operating in a mode that enables measuring angles to the top and bottom edges of the media site to allow the height of the media site to be computed. The user-interface apparatus 505 may be implemented using a handheld portable computing device (e.g., a personal digital assistant (PDA), a Windows Mobile® device, a PocketPC device, a Palm device, etc.) that may be carried using a carrying case that may be clipped to a belt. In some example pedestrian-based MAST system implementations, the video camera 510 may be omitted from the MAST 111, and surveyors (e.g., members of the field force 113) can rely on their own sight to determine the direction in which to direct the field of view of the digital camera 515 to capture an image of a targeted media site. To enable a user to control the MAST 111, the user-interface apparatus 505 is configured to display a user interface that prompts the user of the MAST 111 to perform different measurements and/or capture pictures of a media site. For example, when a user identifies a new media site, the user can press a start button. The user-interface apparatus 505 then prompts the user to specify a plurality of operations to characterize the media site including, for example, 1) measuring a distance to the media site, 2) measuring a height of the media site (e.g., measure angles to the top and bottom of the media site), 3) entering textual information (e.g., owner name, etc.), and 4) capturing one or more pictures of the media site. To capture GPS information and heading information, in a hand-held implementation, the GPS receiver 535 and the digital compass 530 are mounted to the rangefinder 520 so that as the rangefinder 520 is moved the GPS receiver 535 and the digital compass 530 can be used to track the direction and location of the rangefinder 520. For example, as the rangefinder 520 is rotated, the digital compass 530 can correctly measure the direction in which the rangefinder 520 is pointing.

In some example implementations, vehicular-based or pedestrian-based MAST's can be configured to be controlled using a head-mounted controller. For example, headgear to be worn by a member of the field force 113 may be provided with an inertial sensor, a transparent partial (one-eye) visor, a digital camera and a rangefinder. To control a pedestrian-based MAST, the user adjusts his head position to look at a media site through the one-eye visor to target the media site and to perform the distance measurement using the rangefinder 520. The angles used to compute the height of the media site can be derived from the orientation of the user's head. To control a vehicular-based MAST, the transparent partial (one-eye) visor positioned over a user's eye could be used to locate aid target a media site. The inertial sensor in the helmet can be used to generate motion and direction information based on a person's detected head movements to control the example pan-tilt mechanism 525 to position the cameras 510 and 515 and the rangefinder 520.

Figure 7:
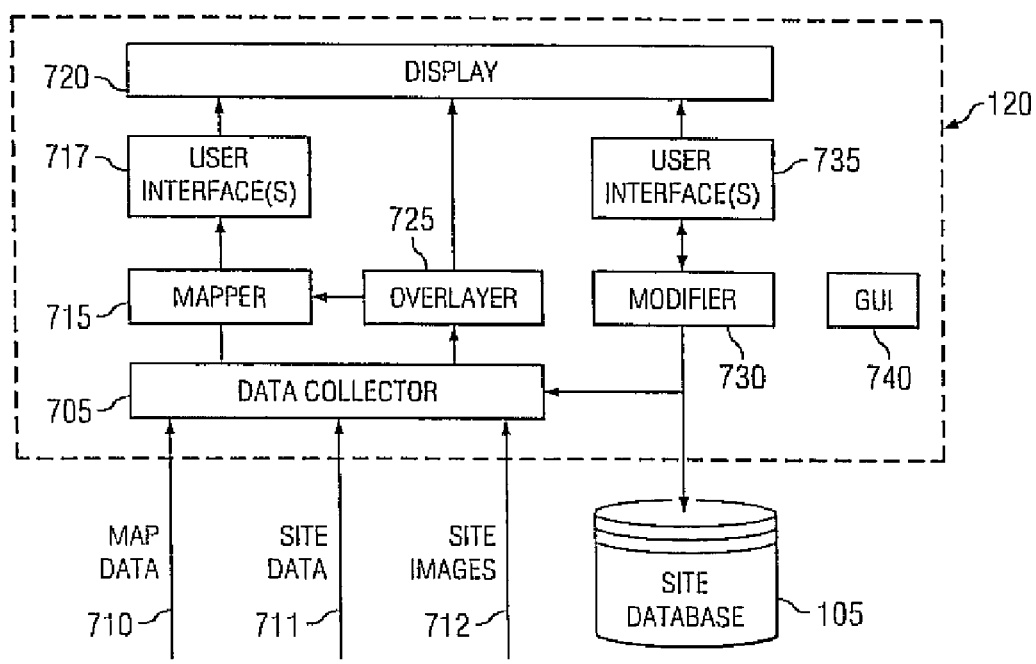
FIG. 7 is a block diagram of an example apparatus that may be used to implement an example site data merger of the example media site data collection system of FIG. 1.

FIG. 7 is a block diagram of the example site data merger 120 of FIG. 1. To collect media site data for merging, the example site data merger 120 includes a data collector 705. The example data collector 705 collects map data 710 from the example third-party images 112 (FIG. 1) and from media site data 711 and media site images 712 collected during one or more media site surveys and/or gathered from the government records 110 (FIG. 1). The example site data 711 and/or the site images 712 may be collected electronically (e.g., collected using the example MAST 111 described herein), may be manually provided from paper records, and/or any combination thereof. In some example implementations, the data collector 705 can be implemented in connection with a user interface to enable a user to enter the site data 711 and/or the site images 712 manually. Additionally or alternatively, if any of the site data 711 and/or the site images 712 were previously entered and/or downloaded, the data collector 705 can collect any or all of the data 710-712 from the example site database 105.

To display the map data 710 collected by the example data collector 705, the example data site merger 120 includes a mapper 715 and a display 720. The example mapper 715 formats and/or creates one or more user interfaces 717 that graphically depict a geographic area and that are presented by the example display 720. Example user interfaces 717 created by the mapper 715 are discussed below in connection with FIGS. 8A-8C and 10. The example display 720 may be implemented using any type of hardware, software and/or any combination thereof that can display a user interface 717 for viewing by a user. For example, the display 720 may include a device driver, a video chipset, and/or a video and/or computer display terminal.

To overlay the site data 711 and/or the site images 712 on top of the user interface(s) 717 created by the mapper 715, the example site data merger 120 includes an overlayer 725. The example overlayer 725 overlays the site data 711 and/or the site images 712 on top of the user interface(s) 717 by providing instructions a) to the display 720 that cause the display 720 to show the overlaid data 711 and 712 and/or b) to the mapper 715. For example, the overlayer 725 may use an application programming interface (API) that directs the mapper 715 and/or the display 720 to add lines and/or text to user interface(s) 717 created by the mapper 715.

To verify, modify and/or update the site data 711 and/or media site information stored in the example site database 105 (e.g., the example coordinate fields 228 and 232 of FIG. 2), the example site data merger 120 includes a modifier 730.

The example modifier 730 presents one or more user interfaces 735 via the display 720 that allow a user of the site data merger 120 to verify, modify and/or update the site data 711. Example user interfaces 735 for verifying, modifying and/or updating the site data 711 and/or the site database 105 are discussed below in connection with FIGS. 8A-8C and 10. In the illustrated example, the mapper 715 and/or the overlayer 725 create a first user interface 717 that displays collected media site data 711 overlaid onto an aerial/satellite photograph (e.g., an aerial/satellite photograph from the map data 710) of a geographic area, and the example modifier 730 presents one or more additional user interfaces 735 that allow a user to adjust the location of a media site based upon the satellite photograph and/or based upon the site images 712. Once the user has finished adjusting the location of a media site (if necessary), the modifier 730 updates the site database 105 (e.g., the example coordinate fields 228 and 232) based upon the collected (and possibly modified) media site data 711.

In the illustrated example, the Google® Earth mapping service tool is used to implement the example data collector 705, the example mapper 715, the example user interface(s) 717, the example display 720, the example overlayer 725, at least a portion of the example modifier 730 and the example user interface(s) 735 of FIG. 7. In other example implementations, other mapping tools such as, for example, Microsoft® Virtual Map could additionally or alternatively be used. For example, the Google® Earth mapping service tool may be implemented as an application that is executed by a general-purpose computing platform (e.g., the example computing platform 1700 of FIG. 17), where a portion of the example data collector 705, the example mapper 715, the example user interface(s) 717 and 735, the example overlayer 725 and a portion of the modifier 730 are implemented by the Google® Earth mapping service application. In particular, the Google® Earth mapping service application collects and displays the map data 710 from the third-party images 112 (e.g., satellite images) stored within a server that implements and/or provides the Google® Earth mapping service interface. The Google® Earth mapping service tool is used to generate the user interfaces 717 that may be displayed on a computer terminal associated with the computing platform. The Google® Earth mapping service tool also generates user interfaces 735 that allow a user to verify and/or modify displayed media site data. Another application and/or utility (e.g., the example overlayer 725) that executes upon the computing platform (and/or a different computing platform) formats the site data 711 and the site images data 712 into a data file suitable for use with the Google® Earth mapping service application (e.g., a file structure in accordance with the KML format). The Google® Earth mapping service application reads and/or processes the KML file generated by the overlayer 725, and the user's personal computer and/or workstation displays the resulting overlaid images and/or user interfaces 717 and 735 generated by the Google® Earth mapping service application for viewing by a user. Once the user has completed viewing, verifying and/or modifying the site data 711, the Google® Earth mapping service tool saves a second KML file that reflects any changes made to the site data 711 by the user using the user interface(s) 735. The example modifier 730 of FIG. 7 parses the site data 711 from the second KML file and adds, stores and/or updates the media site data stored in the site database 105 (e.g., adds, updates and/or modifies the example coordinate fields 228 and 232 of FIG. 2).

To control the example site data merger 120 of FIG. 7, the site data merger 120 includes a graphical user interface (GUI)

740 (e.g., a user input interface). The example GUI 740 of FIG. 7 may be part of an operating system (e.g., Microsoft® Windows XP®) used to implement the site data merger 120. The GUI 740 allows a user of the site data merger 120 to, for example, select a geographic area to be mapped and/or to select the site data 711 and/or the site images 712 to be overlaid onto a geographic map. If the Google® Earth mapping service tool is used to implement a portion of the example site data merger 120, the GUI 740 is used to provide an interface between the user and the Google® Earth mapping service application. For example, the Google® Earth mapping service tool may use an API to display information and/or to receive user inputs and/or selections (e.g., to select and load a KML file) via the GUI 740.

While an example manner of implementing the example site data merger 120 of FIG. 1 has been illustrated in FIG. 7, the elements, processes and devices illustrated in FIG. 7 may be combined, divided, re-arranged, eliminated and/or implemented in any of a variety of ways. Further, the example data collector 705, the example mapper 715, the example user interface(s) 717 and 735, the example display 720, the example overlayer 725, the example modifier 730, the example GUI 740 and/or, more generally, the example site data merger 120 may be implemented using hardware, software, firmware and/or any combination of hardware, software, and/or firmware. Further still, the example site data merger 120 may include additional elements, processes and/or devices than diose illustrated in FIG. 7 and/or may include more than one of any or all of the illustrated elements, processes and devices.

Figure 8A:
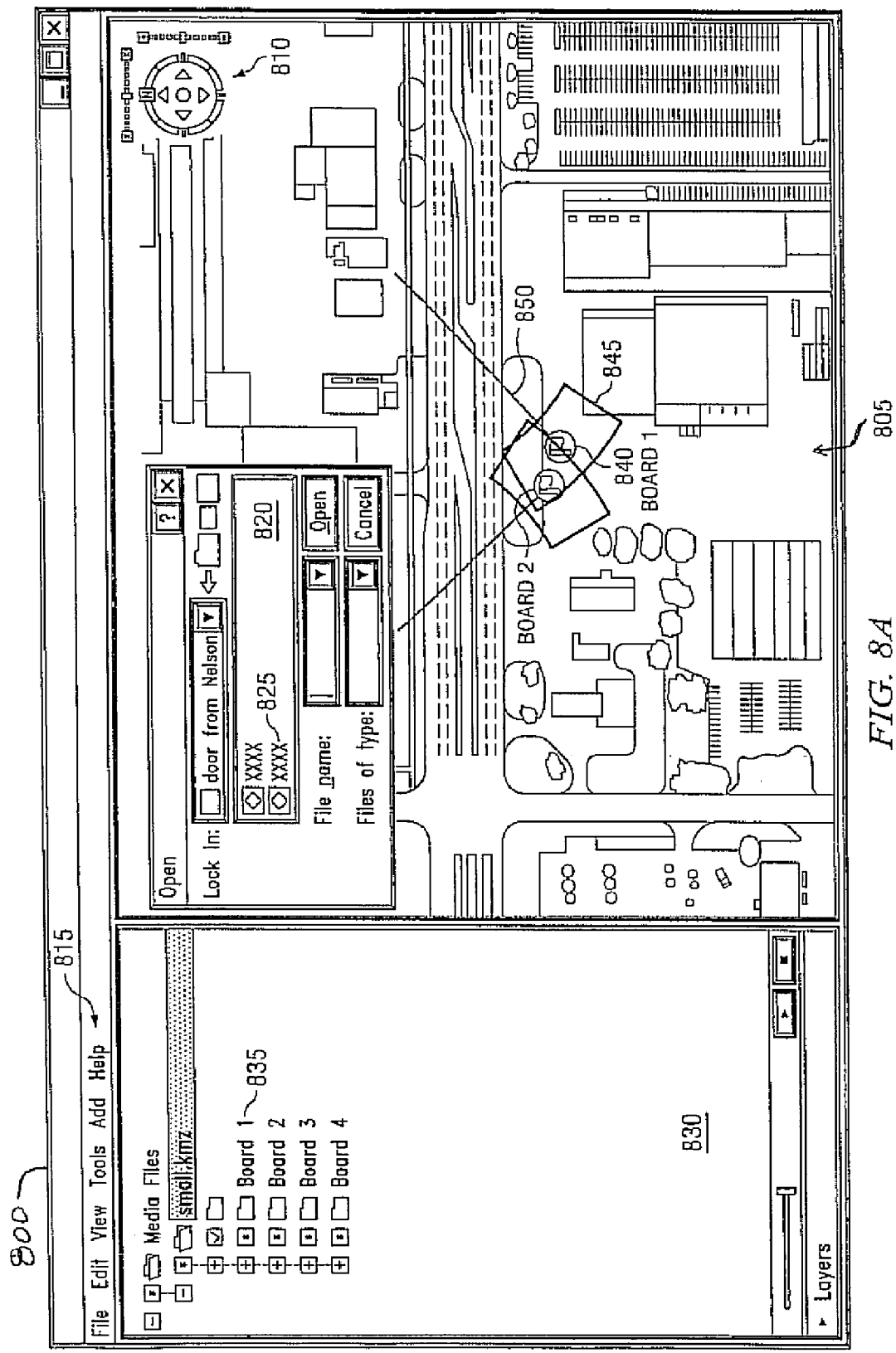
Figure 8C:
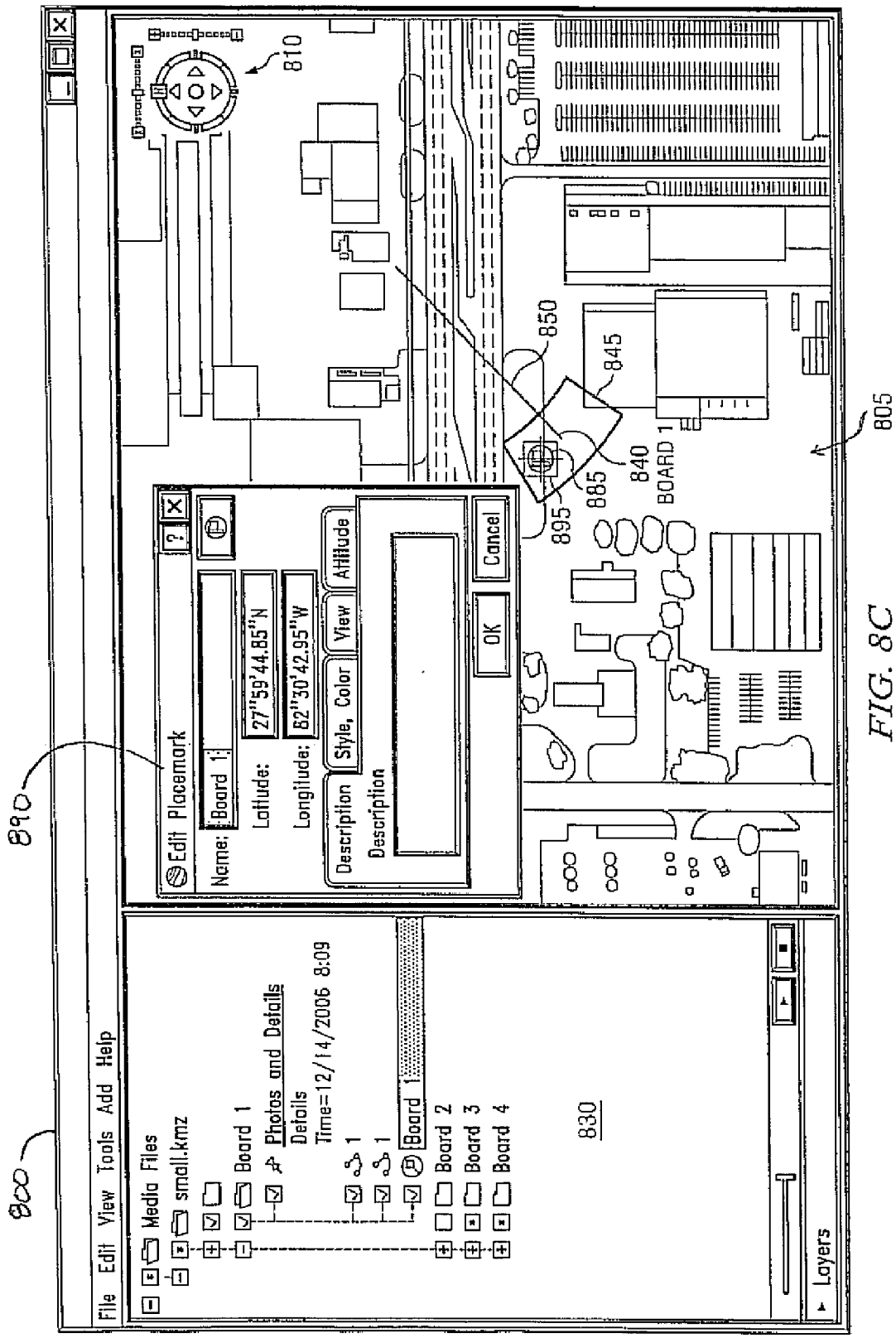

FIGS. 8A, 8B and 8C depict example user interfaces that may be implemented in connection with the example site data merger 120 of FIG. 7 to show locations of surveyed media sites in connection with media site data and to enable users to verify and/or update the media site data. Elements illustrated in FIG. 8A which are substantially similar or identical to elements in FIGS. 8B and 8C are described below in connection with FIG. 8A, but are not described in detail again in connection with FIGS. 8B and 8C. Therefore, the interested reader is referred to the description of FIG. 8A below for a complete description of those elements in FIGS. 8B and 8C which are the same as elements in FIG. 8A.

Turning to FIG. 8A, to display an image of a geographic area, the example user interface 800 includes an image area 805. In the illustrated example, the example image area 805 can display a satellite photograph and/or image of a geographic area of interest. To allow a user to control the image area 805, the example user interface 800 includes any number and/or type of user-selectable user interface controls 810. By using the controls 810, the user can select a desired portion of a satellite, aerial and/or terrestrial image. For instance, in the illustrated example, the example controls 810 include one or more elements that allow the user to, for example, zoom in, zoom out and rotate the image and to pan the image in left-right and/or up-down directions.

To allow a user to select and load a file that includes media site data (e.g., a KML file and/or a keyhole markup ZIP (KMZ) file containing multiple KML files and/or still images and/or video files for respective ones of multiple media sites), the example user interface 800 includes a menu 815 that allows a user to, among other things, open a file-open dialog box 820. The example file-open dialog box 820 allows a user to select and load a media site data file, such as small.kmz. To display media sites associated with an opened media site data file, the example user interface 800 includes a list display area 830. In the illustrated example, the example list display area 830 includes a list of media sites including one entitled "Board 1" and designated by reference numeral 835.

Based upon the list of media sites loaded and based upon the portion of the satellite image currently displayed, the example image area 805 displays information pertaining to one or more of the media sites. In the illustrated example, the example image area 805 displays two media sites indicated by media site markers labeled "Board 1" and "Board 2." In the illustrated example, Board 1 is shown with a media site marker and/or icon 840 that represents the surveyed location of Board 1, a bounding box 845 that represents (based upon the accuracy of the surveying tool) an error margin of location coordinates determined or collected for the surveyed location 840 of Board 1 and a line 850 that represents a line of sight from the location where Board 1 was surveyed to Board 1.

Turning to FIG. 8B, to select media sites to be displayed, the example list display area 830 includes check box controls, one of which is indicated by reference numeral 855. In the illustrated example of FIG. 8B, the check box 855 is blank and, thus, Board 2 is not illustrated in the example image area 805 of FIG. 8B. However, the check boxes for Boards 1, 3 and 4 are checked, therefore, Boards 1, 3 and 4 are displayed, although Boards 3 and 4 are occluded by a photos-and-details window 870.

To display more information for a particular media site, the example list display area 830 includes tree expansion box controls, one of which is indicated in FIG. 8B by reference numeral 860. By alternately clicking on the example tree expansion box 860, information pertaining to Board 1 can be viewed or hidden from view. Example media information includes photos and detailed information that can be accessed by selecting a photos and details link control 865. In the example user interface of FIG. 8B, if the photos and details link 865 is clicked, the photos and details window 870 is displayed. Additionally or alternatively, clicking the site marker icon associated with the media site 840 in the image 805 will launch the window 870. The example window 870 of FIG. 8B displays textual information 875 about the media site as well as one or more photographs 880 and/or video of the media site taken from the end of the line 850 that is opposite the media site. Example textual information 875 includes, for example, the name of the owner of the site, the direction the site is facing, the distance to the site, any other information described above in connection with FIG. 2, etc.

The user interface 800 illustrated in FIG. 8B (including the example photographs 880), facilitates visually determining that the surveyed location 840 of Board 1 is different from an actual location 885 of Board 1. To modify or update the media site data for Board 1 to represent the correct location of Board 1 (i.e., the actual location 885), a properties dialog user interface 890 shown in FIG. 8C may be instantiated by a user. For example, referring to FIG. 8C, to modify the surveyed location of a media site in the example user interface 800, a user clicks their right mouse button (e.g., "right-clicks") with the position controlled by the mouse located on the surveyed media site location in the image 805 to bring up a selection window (not shown) including a selection entitled "properties." When "properties" is selected in the selection window, the properties dialog user interface 890 is shown. The example properties dialog box 890 of FIG. 8C displays the surveyed location of the media site.

In the illustrated example of FIG. 8C, the icon displayed at the surveyed media site location 840 also changes to include a target location icon 895 depicted as a box surrounding the site marker. The user can "click and drag" the target location icon 895 from its original location (e.g., the surveyed location 840) to the actual location of the media site 885 as shown in FIG. 5C. When the user saves the KML file for Board 1 (and/or a KMZ file containing the KML file for Board 1), the location of the media site (e.g., Board 1) is saved with location information representative of the new location 885. Thus, when the site data merger 120 (e.g., the example modifier 730 of FIG. 7) processes the KMZ file, the location of the media site saved in the site database 105 (e.g., the example coordinate fields 228 and 232 of FIG. 2) will be the coordinates of the new location 885 rather than the coordinates of the surveyed location 840. The site data merger 120 also stores other information from the KML file into the site database 105 for the media site. For example, the owner name shown in the textual information 875 of FIG. 8B can be stored in the example owner name field 208 of FIG. 2. Likewise, other elements of the data record can be filled, updated and/or modified based upon the KML file.

FIGS. 9A and 9B illustrate an example data structure 900 that may be used to provide media site data to any or all of the example site data mergers 120 described herein. The example data structure 900 is structured in accordance with a KML file. However, any other type of file format may be used (e.g., a file structure in accordance with the Microsoft® Virtual Earth tool). The example data structure 900 represents media site data for a single media site. As described above, multiple data structures for respective media sites may be stored together in a single file, such as a KMZ file.

To specify a filename, the example data structure 900 includes a filename field 905. The example filename field 905 includes an alphanumeric string that represents the name of the file that contains the data structure 900. To specify the name of the media site associated with the file, the example data structure 900 includes a name field 910. The example name field 910 includes an alphanumeric string that represents the name of the media site. To specify and/or store the media site information that may be viewed (e.g., viewed using the user interfaces of FIGS. 8A-8C) and/or hidden, the example data structure 900 includes folder fields 915 and 920. The example folder fields 915 and 920 delineate the start and end of the media site information for the media site, respectively.

To specify textual information and/or images that can be displayed (e.g., in the example photos and details window 870 of FIG. 8B), the example data structure 900 includes entries 925. The example entries 925 define, describe and provide the information to be displayed when, for example, the example photos and details link 865 of FIG. 8B is selected and/or the site marker icon 840 (FIG. 8B) for the media site is clicked. For example, the entries 925 define the file name 930 of an image to be displayed.

To specify a line of sight from a survey location to a media site (e.g., the example line 850 of FIG. 8A), the example data structure 900 includes entries 935. The example entries 935 include the start and end coordinates 940 of the line, as well as a width and color 945 for the line. To specify a potential survey location error (e.g., the example boundary 845 of FIG. 8A), the example data structure 900 includes entries 950 (FIG. 9B). The example entries 950 include the coordinates of a set of points 955 that collectively define the boundary of the potential media site location error, as well as a width and color 960 for the line. To specify the position of the media site, the example data structure 900 includes coordinates 965. If the data structure 900 is used as an input to the site data merger 120, the example coordinates 965 represent the surveyed location of the media site (e.g., the example location 840 of FIG. 8B). If the data structure 900 is the output of the site data merger 120, the example coordinates represent the verified location of the media site (e.g., the example location 885 of FIG. 8B).

To specify a point of view (e.g., so that the photograph of the site in the pop-up window 870 (FIG. 8B) matches the orientation of the satellite image), the example data structure 900 includes entries 970. The example entries 970 contain values that represent the point of view from the survey location to the media site. The example entries 970 contain coordinates 975 of the survey location, a distance 980 to the media site, a viewing angle (relative to the horizon) 985 from the survey location to the media site and a heading 990 of the surveying equipment.

While the example data structure 900 is illustrated as having the above-described fields and information, the example methods, apparatus and systems described herein may be implemented using other data structures having any number and/or type(s) of other and/or additional fields and/or data. Further, one or more of the fields and/or data illustrated in FIGS. 9A and 9B may be omitted, combined, divided, rearranged, eliminated and/or implemented in different ways. Moreover, the example data structure 900 may include fields and/or data additional to those illustrated in FIGS. 9A and 9B and/or may include more than one of any or all of the illustrated fields and/or data.

Figure 10:
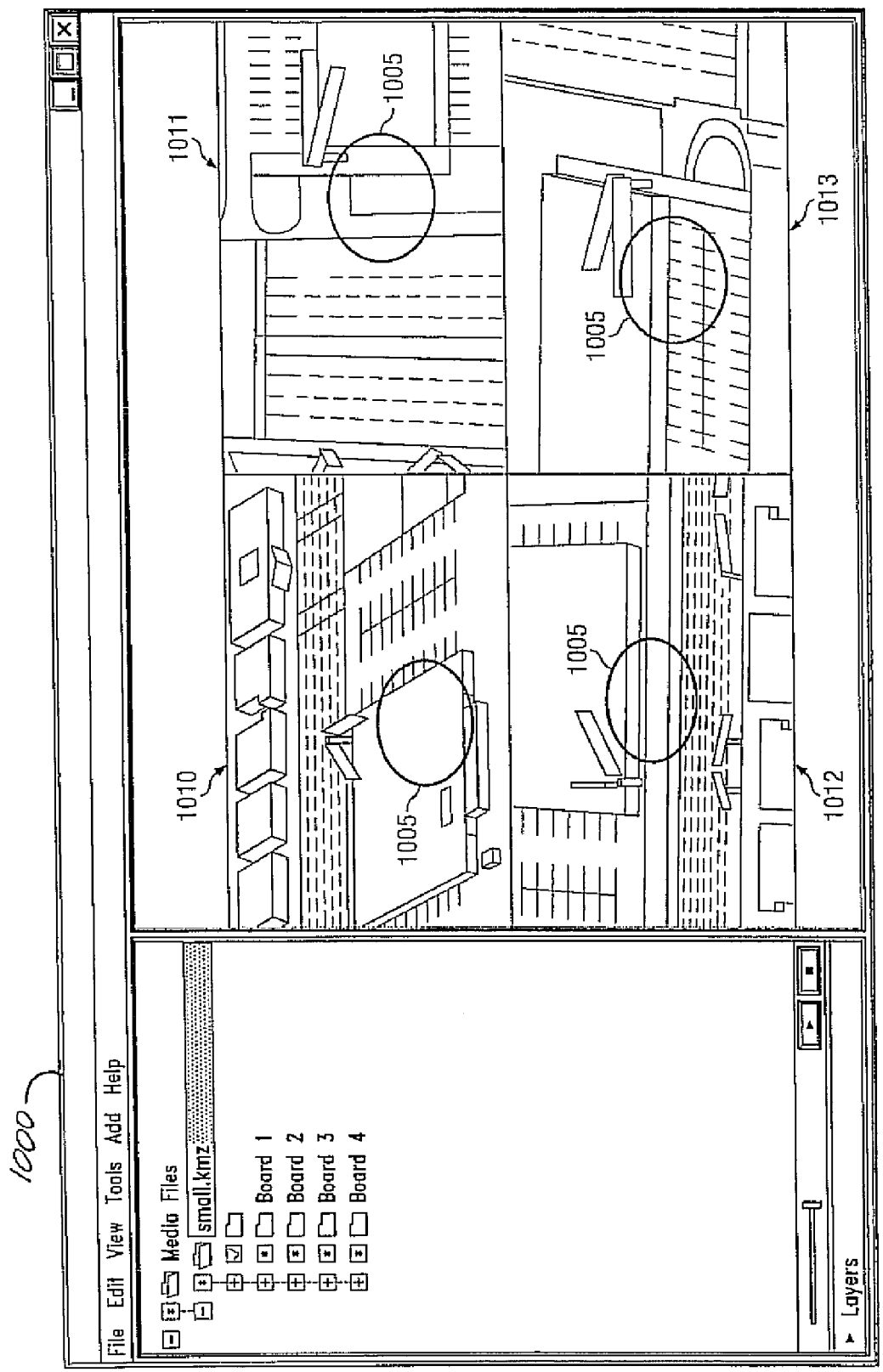
FIG. 10 illustrates an example user interface that may be used to display alternative images of a surveyed media site and verify collected media site data.

FIG. 10 illustrates another example user interface 1000 that may be used to verify the location of a media site. In particular, the example user interface 1000 may be used to implement the example image area 805 of FIGS. 8A-8C. In the example user interface 1000, a surveyed location indicator 1005 of a media site is overlaid on top of four images 1010, 1011, 1012 and 1013 rather than the single aerial/satellite image illustrated in FIGS. 8A-8C. The example images 1010-1013 of FIG. 10 represent and/or illustrate the area surrounding the media site from different locations and/or points of view. By viewing the surroundings of the media site from different perspectives, the location of the media site may be more accurately determined and/or verified.

Figure 11:
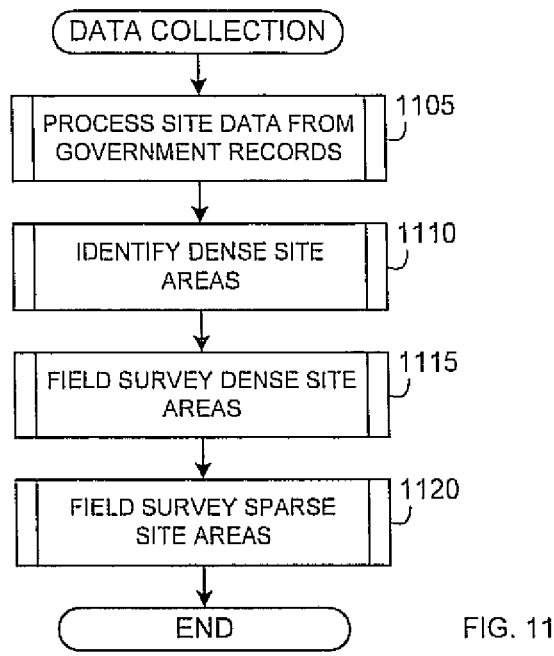
FIGS. 11 and 12 are flowcharts representative of machine readable instructions that may be executed to implement the example media site data collection system of FIG. 1.
Figure 12:
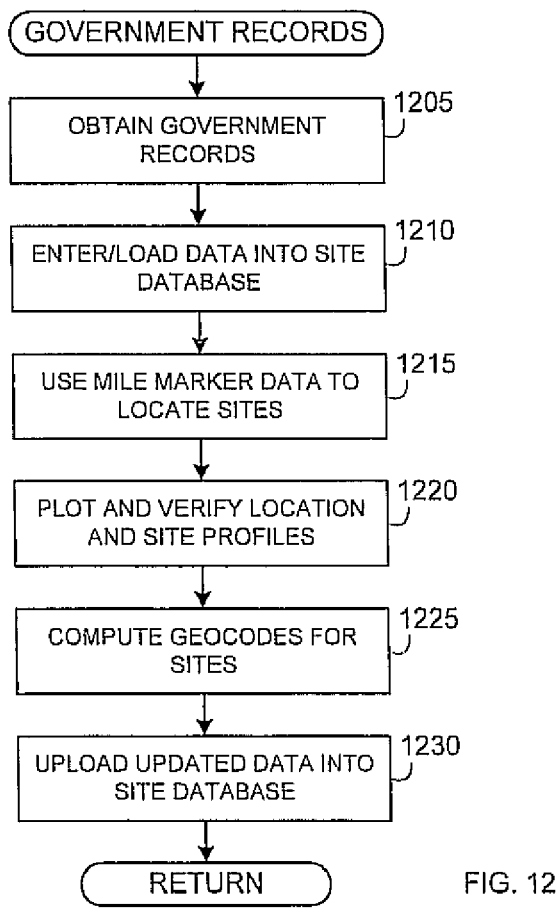
Figure 13:
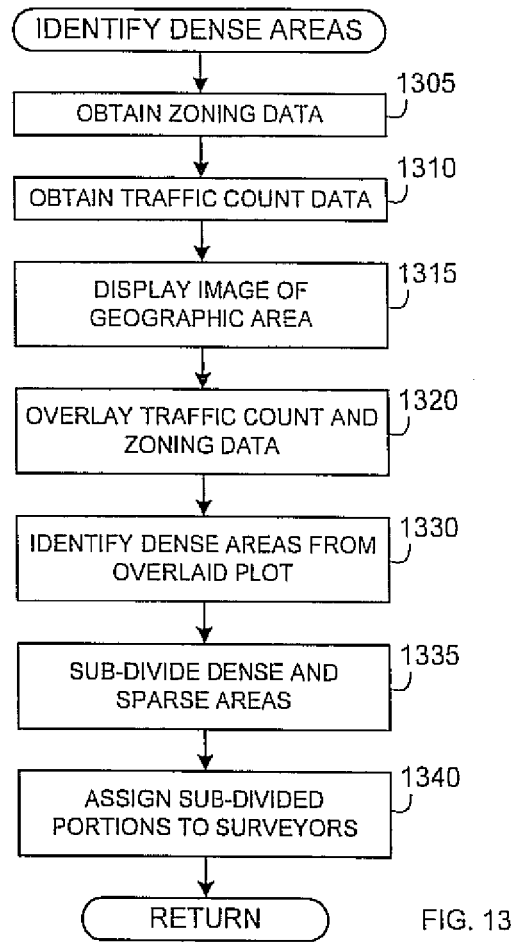
FIG. 13 is a flowchart representative of machine readable instructions that may be executed to implement the example survey planner of FIGS. 1 and 3.
Figure 14:
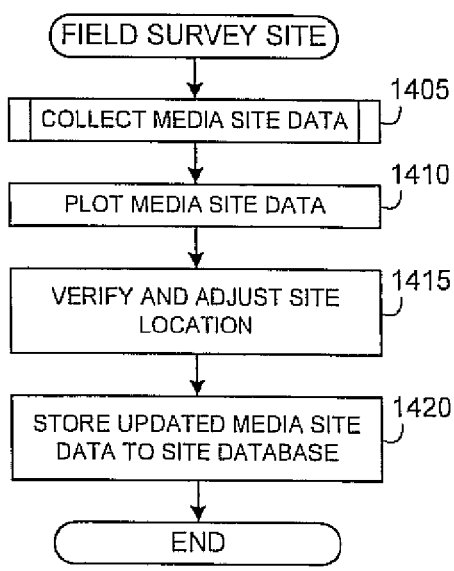
FIG. 14 is a flowchart representative of machine readable instructions that may be executed to implement the example site data merger of FIGS. 1 and 7.
Figure 15:
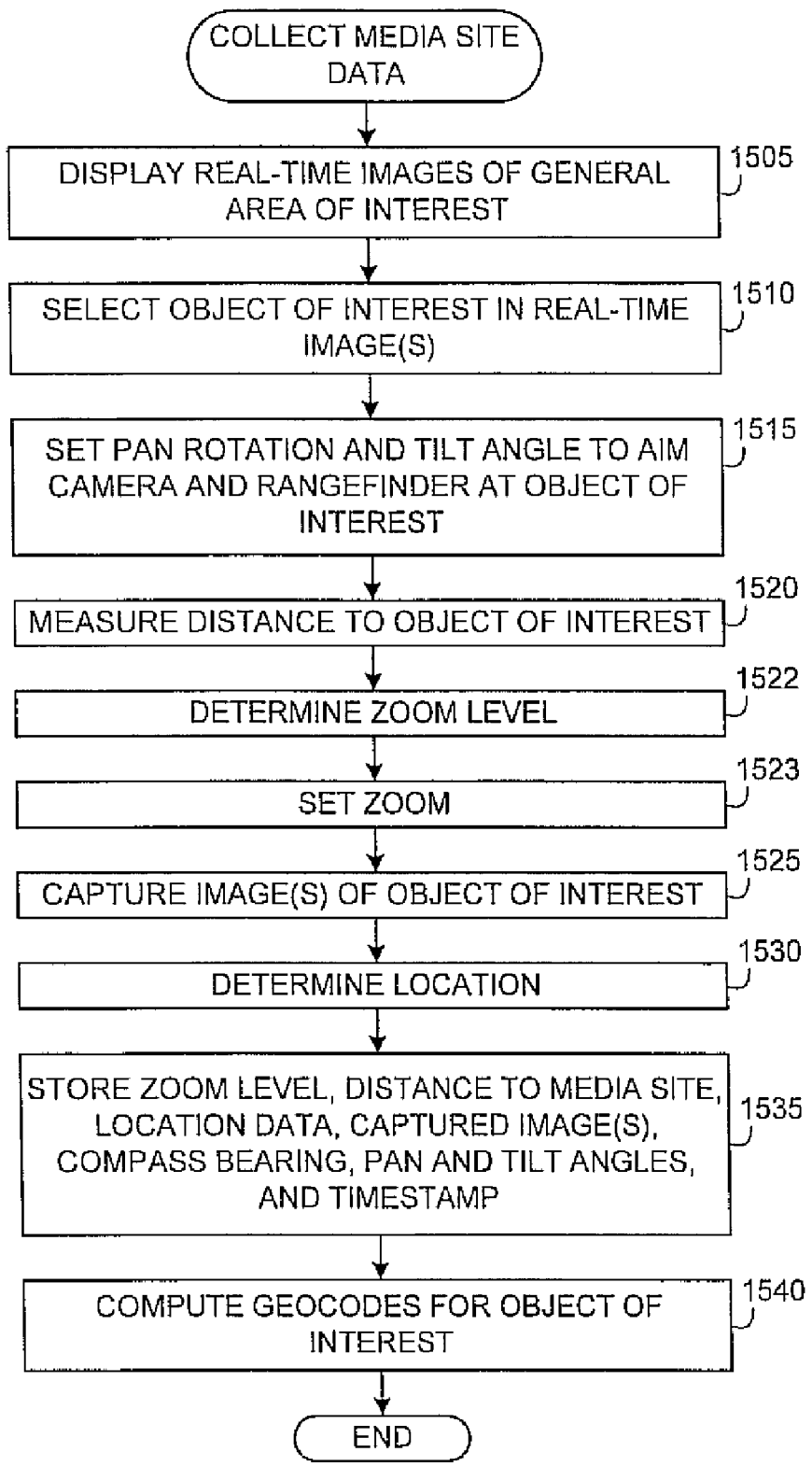
FIG. 15 is a flowchart representative of machine readable instructions that may be executed to implement the example mobile assisted survey tool of FIGS. 1, 5A and 6A-6D.

FIGS. 11 and 12 are flowcharts representative of machine readable instructions that may be executed to implement the example media site data collection system 100 of FIG. 1. FIG. 13 is a flowchart representative of machine readable instructions that may be executed to implement the example survey planner 130 of FIGS. 1 and 2. FIG. 14 is a flowchart representative of machine readable instructions that may be executed to implement the example site data merger 120 of FIGS. 1 and 7. FIG. 15 is a flowchart representative of machine readable instructions that may be executed to implement the example mobile assisted survey tool 111 of FIGS. 1, 5A and 6A-6D. The example processes of FIGS. 11-15 may be performed using a processor, a controller and/or any other suitable processing device. For example, the example processes of FIGS. 11-15 may be implemented in coded instructions stored on a tangible medium such as a flash memory, a read-only memory (ROM) and/or random-access memory (RAM) associated with a processor (e.g., the example processor 1705 discussed below in connection with FIG. 17). Alternatively, some or all of the example processes of FIGS. 11-15 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIGS. 11-15 may be implemented manually or as any combination(s) of any of the foregoing techniques, for example, any combination of firmware, software, discrete logic and/or hardware. Further, although the example processes of FIGS. 11-15 are described with reference to the flowcharts of FIGS. 11-15, other methods of implementing the processes of FIGS. 11-15 may be employed. For example, the order of execution of the blocks may be changed, and/or some of the blocks described may be changed, eliminated, sub-divided, or combined. Additionally, any or all of the example processes of FIGS. 11-15 may be performed sequentially and/or in parallel by, for example, separate processing threads, processors, devices, discrete logic, circuits, etc.

The example process of FIG. 11 may be used to collect and merge media site data and/or information from multiple data sources (e.g., the example data sources 110-113 of FIG. 1) into a site database (e.g., the example database 105). The example process of FIG. 11 begins with processing of media site data from government records (block 1105) (e.g., the example government records 10 of FIG. 1) by, for example, performing the example process of FIG. 12. A survey planner (e.g., the example survey planner 130 of FIGS. 1 and 3) identifies the dense site areas and sparse site areas (block 1110) by, for example, performing the example process of FIG. 13. The dense site areas are surveyed using pedestrian-based MAST's (block 1115), and the sparse site areas are surveyed using vehicular-based MAST's (block 1120). In the illustrated example, the dense and sparse site areas are surveyed using the example process of FIG. 14 described below. The example process of FIG. 11 is then ended.

Turning to FIG. 12, the illustrated example process is used to process media site data from government records (e.g., the government records 110 of FIG. 1). Initially, the site data merger 120 (FIGS. 1 and 2) obtains media site data from the government records 110 (block 1205). The government records 110 may be obtained from any number and/or type(s) of government agencies and/or offices. The media site data collected from the government records 110 is then entered and/or loaded into the site database 105 (FIG. 1) (block 1210).

Using information and/or parameters contained in the government records (e.g., mile marker values), the site data merger 120 can estimate locations of media sites (block 1215). The site data merger 120 then uses the user interfaces 717 (FIG. 7) to plot aid verify location and site information of each media site profile (block 1220). For example, the site data merger 120 can present the location and site profile information of the media site locations to a user for verification using any or all of the example user interfaces of FIGS. 8A-8C and/or 10.

Once the media site locations are verified, the modifier 730 (FIG. 7) of the site data merger 120 can determine geocodes (e.g., a longitude coordinate and a latitude coordinate) for the media sites (block 1225), and store the geocodes in the site database 105 (FIG. 1) (block 1230). For example, the modifier 730 can store the geocodes in the example coordinate fields 228 and 232 of the data structure 200 of FIG. 2. The example process of FIG. 12 is then ended by, for example, returning control to the example process of FIG. 11.

Turning to FIG. 13, the depicted example process is used to implement the example survey planner 130 of FIGS. 1 and 3. Initially, the data collector 305 (FIG. 3) of the survey planner 130 obtains zoning data for a geographic area (block 1305) and traffic count data for the geographic area (block 1310). In the illustrated example, the traffic count is a count of all movements for cars, trucks, buses and pedestrians per geographic area for a given duration. The mapper 315 (FIG. 3) of the survey planner 130 displays an image of the geographic area (block 1315) via one of the user interfaces 317 (FIG. 3). The overlayer 325 (FIG. 3) overlays the obtained zoning and traffic count data onto the image of the geographic area (block 1320). For example, the overlayer 325 creates a KML file that the mapper 315 loads and uses to overlay the zoning and traffic count data.

The partitioner 330 (FIG. 3) of the survey planner 130 identifies dense media site areas and sparse media site areas (block 1330) based on the overlaid zoning and traffic count data. The partitioner 330 partitions or sub-divides the dense and sparse media site areas (block 1335), and the assignor 335 (FIG. 3) assigns the sub-divided portions to surveyors (e.g., member(s) of the example field force 113 of FIG. 1) (block 1340). In the illustrated example, the assignor 335 assigns dense areas to be surveyed by pedestrian surveyors using pedestrian-based MAST's and assigns sparse areas to be surveyed by vehicular surveyors using vehicle-based MAST's (e.g., the MAST 111 of FIGS. 6A-6D). The example process of FIG. 13 is then ended by, for example, returning control to the example process of FIG. 11.

Turning to FIG. 14, the depicted example process is used to survey a media site. Initially, example media site data collection system 100 (FIG. 1) collects media site data and/or information for the media site (block 1405). For example, the example media site data collection system 100 can collect the media site data (e.g., site profile and geocode information) using the example process described below in connection with FIG. 15. The site data merger 120 (FIGS. 1 and 7) displays or plots the collected media site data (block 1410). For example, the mapper 715 and the overlayer 725 can use a Google® Earth mapping service window in connection with the example user interfaces of FIGS. 8A-8C and/or 10 to display the media site data in connection with aerial maps, satellite photographs, etc. of a geographic area in which the media site is located. One or more of the user interfaces 735 and the modifier 730 (FIG. 7) of the data merger 120 then verify and adjust media site location information (block 1415). For example, one or more of the user interfaces described above in connection with FIGS. 8A-8C and 10 may be used to verify and/or adjust the media site location based on user input. The modifier 730 then stores or uploads the media site data to the site database 105 (block 1420). For example, the modifier 730 can parse a KML file to extract values (e.g. site profile and geocode information) that are used to fill fields of a media site data structure (e.g., the example data structure 200 of FIG. 2) stored in the site database 105 to store the updated and/or verified media site data. The example process of FIG. 14 is then ended by, for example, returning control to the example process of FIG. 11.

Turning to FIG. 15, a depicted example process may be implemented to collect and/or obtain media site data for a media site. Initially, the display interface 555 (FIG. 5B) of the user-interface apparatus 505 displays real-time images of a general area of interest (block 1505) captured using the MAST 111 (FIGS. 1, 5A and 6A-6D). For example, a user may manually adjust the MAST 111 as described above in connection with FIGS. 6A and 6B to capture a real-time video feed of a general area of interest in which one or more media sites may be located. Alternatively, the example MAST configuration described above in connection with FIG. 6C may be used so that a user can remotely control the position of the MAST 111 via the user-interface apparatus 505 (FIGS. 5A and 6C). In this manner, the camera positioner interface 580 (FIG. 5B) can control the pan-tilt mechanism 525 (FIG. 5A) to position the field of view of the video camera 510 to capture real-time video of the general area of interest. In any case, de captured real-time images are communicated to the user-interface apparatus 505, and the display interface 555 (FIG. 5B) displays them to a user as shown in FIG. 6C.

A media site object of interest is then selected in the real-time images (lock 1510). For example, using a manually controlled MAST 111 as described above in connection with FIGS. 6A and 6B, a user may visually identify an advertisement object of interest and elect to gather site data about that advertisement object. Alternatively, using an automatically positionable MAST 111 as described above in connection with FIG. 6C, a user may use the user-input interface 560 (FIG. 5B) of the example user-interface apparatus 505 to select a location on an image (e.g., a real-time video feed image) displayed via the display interface 555 (FIG. 5B) to specify an advertisement object to be automatically visually located by the MAST 111.

The camera positioner interface 580 (FIG. 5B) of the user-interface apparatus 505 determines tilt and pan rotation angles and controls the pan-tilt mechanism 525 (FIG. 5A) to set a pan rotation and a tilt angle to aim the digital still picture camera 515 and the rangefinder 520 at the selected media site object (block 1515). In the illustrated example, the camera positioner interface 580 sets the pan rotation and the tilt angle of the camera 515 and the rangefinder 520 by controlling the pan-tilt mechanism 525 to position the MAST 111 to position the field of view of the digital still picture camera 515 (FIG. 5) so that the advertisement object of interest is in substantially the center of the field of view of the camera 515. Additionally or alternatively, the pan rotation and the tilt angle of the camera 515 and the rangefinder 520 can be controlled manually as described above in connection with FIGS. 6A and 613. In some example implementations, the MAST 111 can be provided with a manually controlled pan-tilt adjustment mechanism to allow a user to perform coarse position adjustments of the MAST 111 and can also be provided with the electronic pan-tilt mechanism 525 to enable the camera positioner interface 580 to automatically control fine position adjustments.

The rangefinder 520 (FIGS. 5A and 6A-6C) measures the distance to the media site (block 1520). That is, the rangefinder 520 determines a distance value representative of a distance between the digital camera 515 and the media site object of interest selected by the user. The camera controller 585 (FIG. 5B) of the user-interface apparatus 505 determines a zoom level (block 1522) at which to set the digital camera 515 to capture an image of the user-specified media site. In the illustrated example, the camera controller 585 determines the zoom level based on the distance measured by the rangefinder 520 at block 1520 so that the digital camera 515 can capture at least a portion of the media site object specified by the user at block 1510. The camera controller 585 then sets the zoom level of the digital camera 515 (block 1523) and triggers the digital camera 515 to capture one or more images of the media site (block 1525).

The user-interface apparatus 505 causes the UPS receiver 535 to determine the current location of the MAST 111 (block 1530). The data interface 570 (FIG. 5B) of the user-interface apparatus 505 stores the zoom level of the digital camera 515, the distance to the user-specified media site, the captured image(s), the pan and tilt angles of the digital camera 515 and the rangefinder 520, the location information of the MAST 111 and a timestamp indicative of a time at which the digital camera 515 captured the media site image(s) (block 1535). Using the GPS location, the pan and tilt angles and the distance to the media site, the location information generator 590 (FIG. 5B) of the user-interface apparatus 505 determines the location of the media site (block 1540). An example manner in which the location information generator 590 can determine location coordinates indicative of the location of the media site at block 1540 is described below in connection with FIG. 16. The example process of FIG. 15 ends by, for example, returning control to the example process of FIG. 14.

Figure 16:
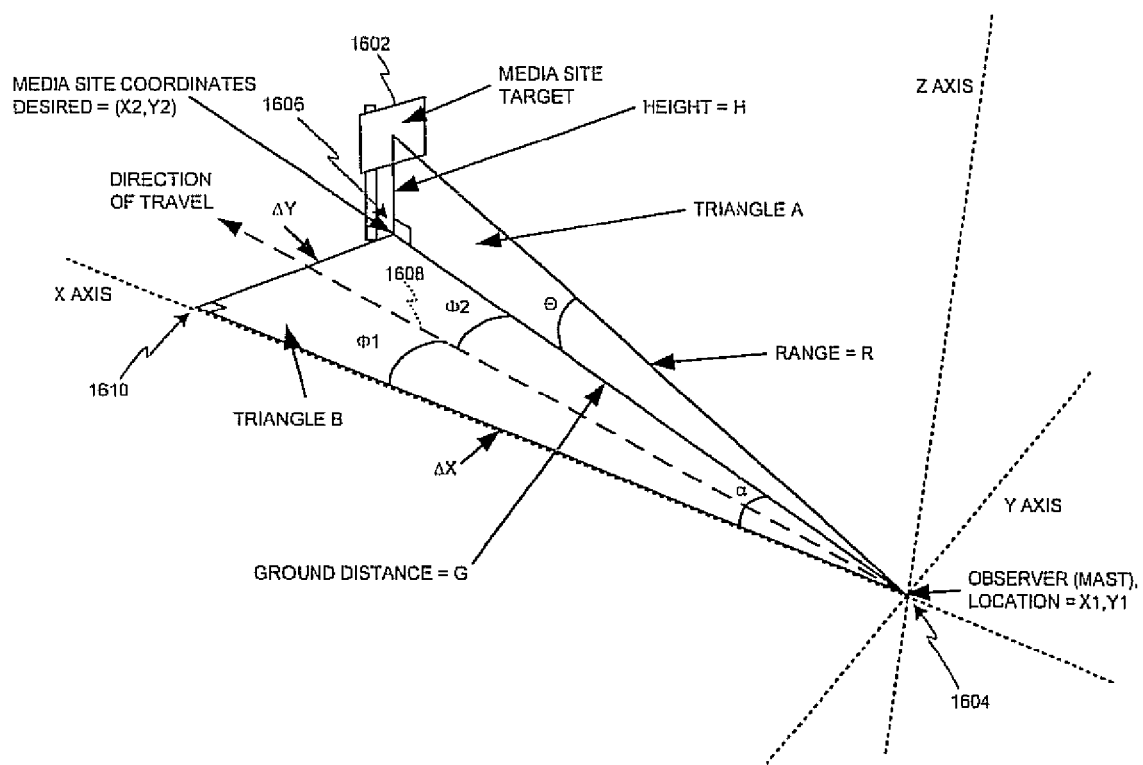
FIG. 16 illustrates a three-dimensional Cartesian coordinate system showing a plurality of dimensions that may be used to determine a location of a media site based on a location of an observer.

FIG. 16 illustrates a three-dimensional Cartesian coordinate system showing a plurality of dimensions that may be used to determine a location of a media site 1602 based on a location of the MAST 111 at the time it is used to capture an image of the media site 1602. In the illustrated example, a location (X1,Y1) of the MAST 111 (observer) is designated by reference numeral 1604, and a location (X2,Y2) of the media site 1602 to be determined is designated by reference numeral 1606. The dimensions used to determine the media site location (X2,Y2) 1606 are shown in association with a right-angle triangle A and another right-angle triangle B overlaid on the Cartesian coordinate system. A first leg of the triangle A represents a MAST-to-media site ground distance (G) extending between the MAST location 1604 and the media site location 1606 and a second leg of the triangle A represents a height (H) of the media site. The MAST-to-media site ground distance (G) and the media site height (H) are determined as described below in connection with equations 1 and 2. A hypotenuse of the triangle A represents a range (R) measured by the rangefinder 520 (FIG. 5) and extends from the MAST location 1604 to substantially the center of the media site 1602. An angle (Θ) between the second leg (G) and the hypotenuse (R) of the triangle A represents a tilt angle (Θ) of the rangefinder 520 at the time it measured the range R). The tilt angle (Θ) can be provided by the pan-tilt mechanism 525 (FIGS. 5A and 6C). Alternatively, in a manually controlled MAST as depicted in FIGS. 6A and 6B, the tilt angle (Θ) can be provided by a tilt angle sensor (not shown) fixedly mounted relative to the rangefinder 520. In this manner, as the rangefinder 520 is tilted, the tilt angle sensor is also tilted by the same amount to detect the tilt angle of the rangefinder 520.

In the triangle B, a direction of travel line 1608 represents a heading of the MAST 111 (e.g., the heading of a vehicle carrying the MAST 111). A first angle (Φ1) defined by the travel line 1608 and a first leg of the triangle B represents the angular heading of the MAST 111 (e.g., the vehicle carrying the MAST 111) relative to an x-axis of the Cartesian coordinate system (i.e., the MAST-travel angle (Φ1)). The MAST-travel angle (Φ1) can be provided by the digital compass 530 (FIGS. 5A and 6C) or the GPS receiver 535 (FIGS. 5A and 6A-6C). A second angle (φ2) defined by the travel line 1608 and a hypotenuse of the triangle B represents the angle of the rangefinder 520 relative to the heading of the MAST 111 (i.e., the rangefinder-MAST-heading angle (Φ2)). The rangefinder-MAST-heading angle (Φ2) can be provided by the pan-tilt mechanism 525 (FIGS. 5A and 6C). Alternatively, in a manually controlled MAST as depicted in FIGS. 6A and 6B, the rangefinder-MAST-heading angle (Φ2) can be provided by the rotary encoder 635. An angle (α) defined by the hypotenuse and the first leg of the triangle B represents the angle between the location (X2,Y2) of the media site 1602 and the x-axis of the Cartesian coordinate system. The angle (α) can be determined as described below in connection with equation 3.

In the illustrated example, equation 1 below is used to determine the MAST-to-media site ground distance (G), and equation 2 below is used to determine the media site height (H).

$$G = (R)\cosine(\Theta) \quad \text{Equation 1}$$

$$H = (R)\sine(\Theta) \quad \text{Equation 2}$$

In equation 1 above, the MAST-to-media site ground distance (G) is determined by multiplying the MAST to media site range (R) by the cosine of the tilt angle (Θ). In equation 2 above, the media site height (H) is determined by multiplying the MAST to media site range (R) by the sine of the tilt angle (Θ).

In the illustrated example of FIG. 16 in which the media site 1602 is located to the right of the direction of travel line 1608, equation 3 below is used to determine the angle (α) between the location (X2,Y2) of the media site 1602 and the x-axis of the Cartesian coordinate system. In other examples in which the media site 1602 is located to the left of the direction of travel line 1608, equation 4 below is used instead of equation 3 to determine the angle (α) between the location (X2,Y2) of the media site 1602 and the x-axis of the Cartesian coordinate system.

$$\alpha = \Phi 1 + \Phi 2 \qquad \text{Equation 3}$$

$$\alpha = \Phi 1 - \Phi 2 \qquad \text{Equation 4}$$

As shown in FIG. 16, the first leg of triangle B is labeled as (ΔX) and the second leg is labeled as (ΔY). The distance of the first leg (ΔX) represents a distance extending between a right-angle intersection 1610 of the first and second legs of triangle B and the location (X1,Y1) of the MAST 111 at a time at which the MAST 111 captured an image of the media site 1602. The distance of the second leg (ΔY) represents a distance extending between the right-angle intersection 1610 and the location (X1,Y1) of the MAST 111. In the illustrated example, the distance (ΔX) represented by the first leg is determined using equation 5 below, and the distance (ΔY) represented by the second leg is determined using equation 6 below.

$$\Delta X = (G)\cosine(\alpha) \qquad \text{Equation 5}$$

$$\Delta Y = (G)\sine(\alpha) \qquad \text{Equation 6}$$

As shown in equation 5 above, the distance (ΔX) represented by the first leg of triangle B is determined by multiplying the MAST-to-media site ground distance (G) by the cosine of the angle (α). As shown in equation 6 above, the distance (ΔY) represented by the second leg of triangle B is determined by multiplying the MAST-to-media site ground distance (G) by the sine of the angle (α).

In the illustrated example, the media site location (X2,Y2) 1606 is determined using equation 7 and 8 below.

$$X2 = X1 + \Delta X \qquad \text{Equation 7}$$

$$Y2 = Y1 + \Delta Y \qquad \text{Equation 8}$$

As shown above in equation 7 above, the x-axis location coordinate (X2) of the media site 1606 is determined by adding the x-axis location coordinate (X1) (1604) of the MAST 111 to the distance (ΔX) represented by the first leg of triangle B. As shown in equation 8 above, the y-axis location coordinate (Y2) of the media site 1606 is determined by adding the y-axis location coordinate (Y1) (1604) of the MAST 111 to the distance (ΔY) represented by the second leg of triangle B.

Figure 17:
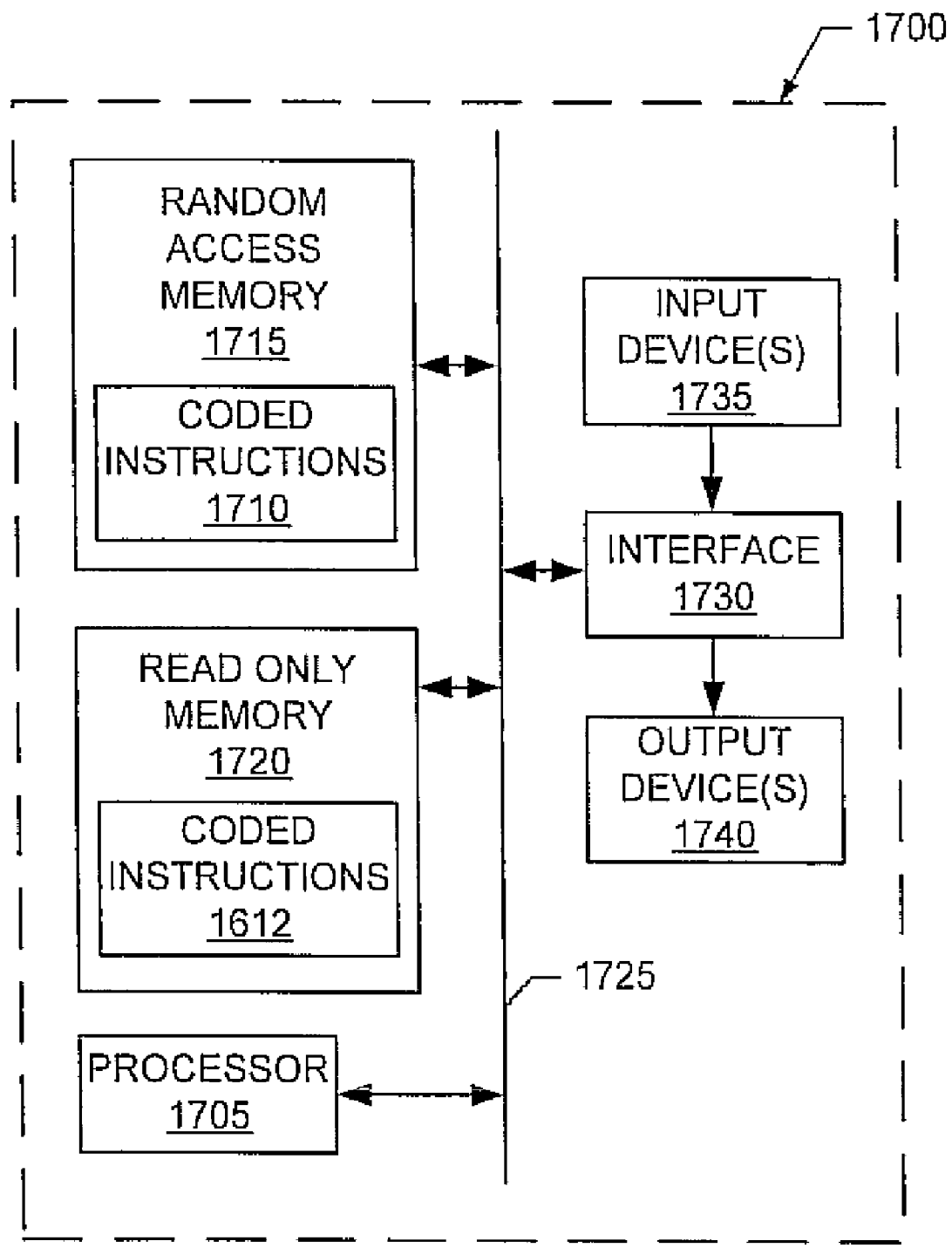
FIG. 17 is a block diagram of an example processor platform that may be used and/or programmed to implement the example processes of FIGS. 11-15 to implement any or all of the example media site data collection system, the example survey planner, the example site data merger and/or the example mobile assisted survey tool described herein.

FIG. 17 is a block diagram of an example processor platform 1700 that may be used and/or programmed to implement any or all of the example MAST 111, the example site data merger 120 and/or the example survey planner 130 of FIGS. 1, 3, 5A and/or 7. For example, the processor platform 1700 can be implemented by one or more general purpose processors, processor cores, microcontrollers, etc.

The processor platform 1700 of the example of FIG. 17 includes at least one general purpose programmable processor 1705. The processor 1705 executes coded instructions 1710 and/or 1712 present in main memory of the processor 1705 (e.g., within a RAM 1715 and/or a ROM 1720). The processor 1705 may be any type of processing unit, such as a processor core, a processor and/or a microcontroller. The processor 1705 may execute, among other things, the example processes of FIGS. 11-15 to implement the example MAST 111, the example site data merger 120 and/or the example survey planner 130 described herein. The processor 1705 is in communication with the main memory (including a ROM 1720 and/or the RAM 1715) via a bus 1725. The RAM 1715 may be implemented by DRAM, SDRAM, and/or any other type of RAM device, and ROM may be implemented by flash memory and/or any other desired type of memory device. Access to the memory 1715 and 1720 may be controlled by a memory controller (not shown). The RAM 1715 may be used to store and/or implement, for example, one or more audible messages used by an interactive voice response system and/or one or more user interfaces.

The processor platform 1700 also includes an interface circuit 1730. The interface circuit 1730 may be implemented by any type of interface standard, such as a USB interface, a Bluetooth interface, an external memory interface, serial port, general purpose input/output, etc. One or more input devices 1735 and one or more output devices 1740 are connected to the interface circuit 1730. The input devices 1735 and/or output devices 1740 may be used to implement, for example, the example displays 320 and 720 of FIGS. 3 and 7.

Figure 18:
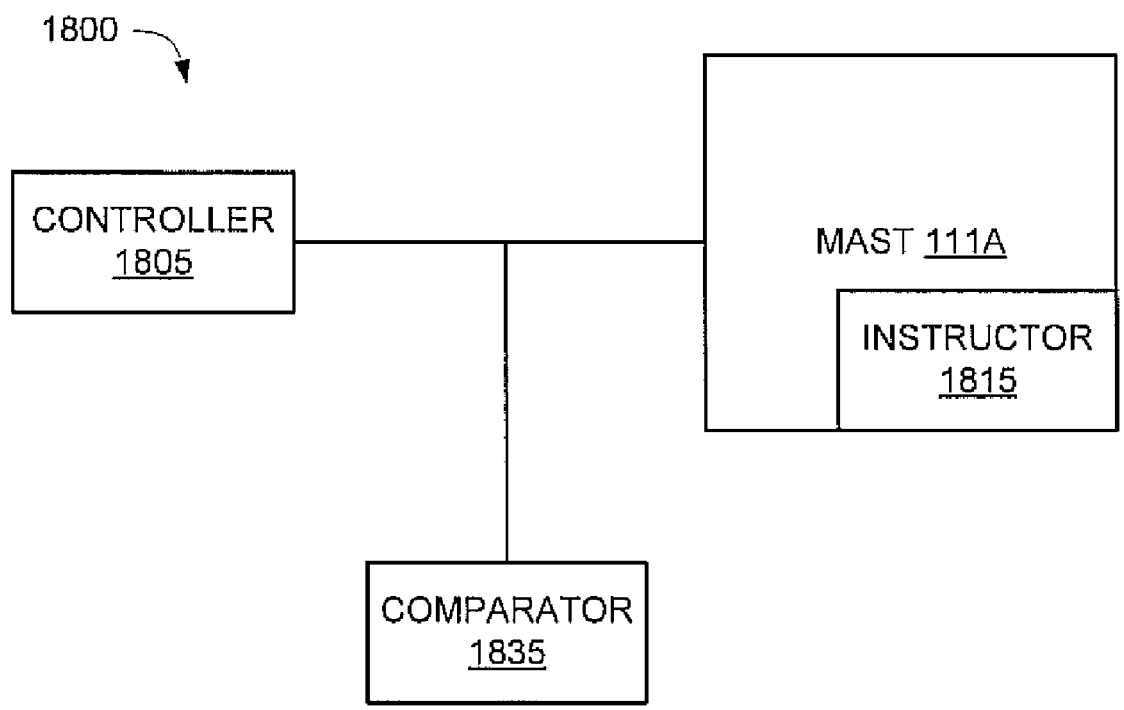
FIG. 18 is a block diagram of an example auditing system used to audit signage.

FIG. 18 is a block diagram of an example auditing system 1800 to audit outdoor or indoor signage. The example auditing system 1800 is a modified version of the MAST 111 described above. In the illustrated example, the MAST 111 is still mounted on a vehicle and structured as shown in FIG. 5A. However, the user interface apparatus 505 is modified to perform one or more automatic signage auditing tasks. For instance, in an outdoor advertising auditing implementation, the apparatus 505 is programmed with the location(s) of one or more outdoor signs to be audited. These location(s) can be identified by, for example, geocodes. The user interface apparatus 505 is further provided with navigation software to provide turn-by-turn directions to guide a driver of the vehicle carrying the modified MAST 111 to guide the vehicle to the signage to be audited. Alternatively, the user interface apparatus 505 may provide directions to any operator carrying the modified MAST 111 in virtually any environment in which an automobile may be impractical or prohibited, whether indoor or outdoor, such as, for example, in a dense urban setting, a supermarket, a stadium, an amusement park, an amphitheatre, an airport, a train station, a subway, a bus, a shopping mall, or anywhere else signage may appear. In the alternative implementations, the apparatus 505 is programmed with the locations of the signage to be audited. For indoor applications, mapping systems other than GPS band systems may be utilized.

When the modified MAST 111 reaches a location of a sign to be audited, the modified MAST 111 uses the pan/tilt mechanism 525 to point a high resolution camera 515 at the location of the sign. The camera 515 is then actuated to take a first high resolution photograph of the sign being audited. The geocodes provided by the UPS receiver 535 at the time of the first photograph are recorded in association with the first photograph. Similarly, the pan/tilt angles of the camera and/or the date(s) and time(s) at which the photographs are taken are recorded in association with the first photograph. The geographic location information allows triangulation of the site's geographic location.

The user interface apparatus 505 then waits for the MAST 111 to move a distance to a second location wherein the sign is expected to still be within photographic range of the camera 515. The modified MAST 111 again uses the pan/tilt mechanism 525 to adjust the camera 515 and point the high resolution camera 515 at the location of the sign. The camera 515 is then actuated to take a second high resolution photograph of the sign being audited. The geocodes provided by the GPS receiver 535 at the time of the second photograph are recorded in association with the second photograph. Similarly, the pan/tilt angles of the camera and/or the date(s) and time(s) at which the photographs are taken are recorded in association with the second photograph.

The user interface apparatus 505 then directs the operator to the next location/sign to be audited.

The collected photographs and associated data are then used to compare the actual signage photographed to the signage identified in a database. For example, billboard owners are often paid a fee to display an advertisement (e.g., an advertisement for Movie A) on particular billboard(s) (e.g., a billboard at intersection B) for particular dates (e.g., the month of June, 2008). A database is created reflecting the identity of the advertisement, the billboard(s) on which it is to be displayed, and the time frame. The photographs and geographic location information collected by the modified MAST 111 can then be automatically and/or manually compared against the data in the database to determine whether the billboard owner is in fact complying with the requirements of the advertisement purchase. To ensure this comparison is meaningful (e.g., to avoid tampering by the billboard owner), the database is preferably maintained by the advertiser and/or by a neutral third party (e.g., The Nielsen Company) who is provided with the relevant data by the advertiser, the advertising agency, the billboard owner and/or any other entity. In this example, the information provided to the neutral third party is at least partially based on a contract to provide advertising services via, at least in part, indoor and/or outdoor signage. In this way, the neutral third party can develop, provide and/or sell reports verifying that billboard owners are meeting their contractual obligations. In addition, the neutral third party can provide reports reflecting the condition(s) of the various signage to ensure that the advertisement is being displayed at a sufficient (e.g., contracted for) quality level.

As mentioned above, the photographs and geographic location information collected by the modified MAST 111 can be automatically and/or manually compared against the data in the database to determine whether the billboard owner is in fact complying with the requirements of the advertisement purchase. Automatic comparison can be performed using image recognition techniques. For example, optical character recognition can be employed to detect one or more logos appearing in the photographs of the signage. Methods and apparatus to recognize logos are described in U.S. Patent Application Ser. No. 60/986,723, filed on Nov. 9, 2007 and entitled "Methods and Apparatus to Measure Brand Exposure in Media Streams," which is hereby incorporated by reference in its entirety. Alternatively or additionally, a manual visual comparison of the photographs collected by the modified MAST 111 can be compared to a stored image of the advertisement expected to be carried by the signage to verify compliance.

In other examples, the modified MAST 111 is used to collect other types of information from indoor or outdoor signage. For instance, in some examples a technique similar to that described above is employed to collect images of movable letter signage at fuel or petroleum (e.g., gas) stations with the modified MAST 111. The gas prices appearing on the signage photographed by the MAST 111 can be recognized using optical character recognition analysis to develop lists, statistics and/or economic indicators about gas prices and/or other economic indicators such as, for example, oil prices, oil supplies, a recession, currency values, consumer confidence, or any other bellwether or index that correlates, even remotely, with the price of fuel. For example, statistics indicating the average gas price in a particular geographic location (a city, village, neighborhood, state, country, etc.), the average gas prices for particular retailers (e.g., British Petroleum (BP), Conoco, etc), can be calculated. If enough modified MAST 111 systems are employed, the gas price statistics can be developed in near real time so that the data is extremely current. The gas price statistics, including, for example, the best gas prices in a particular region, can be published in any form to assist consumers in their purchase decisions. For example, the gas price numbers can be broadcast via the Internet and downloaded to consumers in their automobiles via, for instance, satellite, wifi, or any other broadcast medium. In some examples, the downloaded information is integrated into navigation systems in the automobiles to guide or direct consumers to a particular fuel station that has low-priced gas.

Other examples of auditing movable letter signage abound. For instance, in some examples, the modified MAST 111 is utilized to photograph movie theater signage to collect data concerning motion pictures. The data collected could be used to determine the number of movie theaters running a particular movie (e.g., a geographic area of interest), the length of time a given movie remains in theaters, etc. In addition, the data collected by the modified MAST 111 could be used to create reports that enable movie distributors to verify that they are receiving appropriate compensation from movie theaters (e.g., movie theaters are not running movies outside of—e.g., before or after—the contracted for time frame). In such verification examples, the photographs taken by the MAST 111 are preferably date and time stamped to facilitate comparison to appropriate contract terms and/or payment records. For example, this example method of monitoring the distribution of motion pictures may be used to detect whether royalties were paid for showing the motion picture on a particular date and to generate a report based on the detection. In addition, unauthorized distribution of a motion picture may also be detected.

In other example implementations, the modified MAST 111 is used to audit the condition of signage to enable a signage provider to determine when signage is in need of repair or replacement. For example, governmental agencies charged with providing road signage (e.g., the US. Department of Transportation, etc.) are sometimes responsible for maintaining thousands of signs over thousands of miles of roadways. By programming the modified MAST 111 with the location(s) of the sign(s) to be monitored, the example auditing system is adapted to survey the condition of road signs and identify signs in need of repair or replacement. The process described above (i.e., taking photographs with the modified MAST 111 of the expected position of the road sign(s) and analyzing the photographs) can be used to determine which, if any sign(s) are in need of attention. Damaged signs can be detected by comparing the photograph of the sign to a recorded image of the expected appearance of the sign. The modified MAST 111 may also be used to audit the environment proximate a road sign. For example, as described herein, if a road sign is obscured by fallen debris or any other growth of vegetation, the environment proximate the road sign may need to be cleared. Furthermore, the modified MAST 111 may also be used to survey road signs and audit the road signs to determine if the road signs contain current information. When new streets, access ramps and/or traffic patterns, for example, are created, road signs typically need to be updated to reflect the change. If a road sign has been overlooked and left unchanged, the outdated signage may be located by methods and apparatus described herein. Other road signs in need of attention may be surveyed as well. Also, as explained above, these comparisons can be fully automated, partially automated or manual.

In yet another example implementation, the modified MAST 111A and/or related methods may be used with a service such, as for example Google® Earth mapping or "Street View" services. Through such service, a user could contract, for example via the Internet, for a vehicle or other operator to pass by and automatically or otherwise capture high resolution images of a particular location such as, for example, a house, a stretch of road, a lot of land, etc. The service may provide the user with the images (e.g., still or video) substantially instantaneously (e.g., via the Internet or a wireless communications service) or at a later time and/or date. This implementation may be used by a user to for a multitude of purposes including, for example, monitoring a house or other property the user has for sale, monitoring a house or other property the user is considering buying, checking on hotels the user is considering visiting, monitoring the user's own home while away on vacation or business, etc. Furthermore, mortgage companies or other business may use the service to monitor or investigate general or specific conditions of their current or prospective holdings.

In a further example implementation, a business may use the modified MAST 111A and/or related methods to monitor its franchises and/or its competition. For example, a business such as McDonalds® could use or contract use of the modified MAST 111A and/or related methods to have images or videos of one or more restaurant location(s) captured to monitor an appearance of the restaurant(s). Also, a business such as, for example, Blockbuster® could use or contract use of the modified MAST 111A and/or related methods to have its competition video/photographed for market research purposes. Furthermore, in the example implementations in which use of the modified MAST 111A and/or related methods is contracted through a service provider, for example on an "on demand" basis, the modified MAST 111A may be mounted, for example, on taxi cabs and the dispatching (i.e., implementation of the service) could be a passenger-less "filler" task between paying fares.

The example signage auditing system 1800, details of which of are shown in FIG. 18, may be used to audit a media site to verify that information recorded about the media site such as, for example, tee information stored in the site database 105 described above, is accurate and/or to verify that the media site is being operated in accordance with contractually agreed terms. For example, the system 1800 may be used to verify that a media site is in the exact location described to an advertiser, is illuminated, contains certain names, trademarks, words, characters, images, prices, or other indicia, is a particular type of signage or other advertisement, etc.

The example system 1800 includes a controller 1805 that may include, in whole or in part, the survey planner 130 described above. The controller 1805 determines one or more media location(s) to be surveyed or audited. Data associated with the media sites to be surveyed is stored in a memory, which may include at least some of the data detailed above with respect to the site database 105 and/or the data described above with respect to FIG. 2 including, for example, a recorded location of the media site, a recorded condition of the media site, a sign type and/or recorded indicia (e.g., an expected advertisement), as detailed herein.

The example system 1800 further includes a modified MAST 111A. The modified MAST 111A is substantially similar to the MAST 111 described above in connection with FIGS. 5A and 5B. However, the example modified MAST 111A of FIG. 18 has been modified to include an instructor 1815. The instructor 1815 instructs a person driving a vehicle or person carrying the modified MAST 111A, (e.g., an employee or contractor of an advertiser or a third party auditing company), to a location at or proximate the indoor or outdoor signage to be surveyed. The location(s) to be surveyed are supplied by the modified MAST 111A using any suitable communications media (e.g., a wired or wireless connection, via the Internet, etc.). The instructor 1815 of the illustrated example includes and/or interfaces with a navigation program and a database of street maps. The navigation program utilizes the location information provided by the GPS receiver 535 and the street maps to provide directions to the person moving the modified MAST 111A through any suitable audio or visual signal. Once the MAST 111A is within photographic range of a media site to be photographed, the pan/tilt mechanism 525 of the modified MAST 111A directs the camera 515 to capture a first image of the media site. The modified MAST 111A includes a memory or storage medium to record the photograph in association with the position of the camera 1820. In the illustrated example, the modified MAST 111A records the geocode of the precise location of where the first image was captured. Once the first image is captured, the instructor 1815 instructs the driver to move to a second location at or proximate the same media site to be surveyed. The second location is different than the first location. Once the modified MAST 111A is in the second location, the MAST 111A once again directs the camera to a certain tilt, pan, zoom, etc. to capture a second image of the media site to be surveyed. The MAST 111A also records the position (e.g., the geocode) of the second location.

The modified MAST 111A transfers the data it collects to a comparator 1835. The modified MAST 111A can be communicatively coupled to the comparator 1835 and/or the controller 1805 using any past, present or future networking and/or communication technology. In the illustrated example, the comparator 1835 is implemented by a central facility of an auditing company that collects and analyzes data from a plurality of modified MASTs 111A.

The comparator 1835 can process the data collected by the MAST(s) 111A in any manner suitable for the intended application. For example, if the application is to verify the location of a media site such as a billboard, the comparator 1835 reviews the first and second photographs taken by the modified MAST 111A of the location of the media site recorded in the database. In other words, the MAST 111A captures images of the location where the media site is supposed to be. If the media site is at or near the recorded location, the media site will appear in both the first and the second images. If the media site is not shown in both of the images, then the comparator 1835 concludes that the location of the media site is incorrectly recorded in the database. To determine the actual location of the media site, when the media site does appear in both the first and the second images, the comparator 1835 processes the data from both the first and the second images with, for example, the triangulation techniques described above.

If the system 1800 is being utilized for another purpose such as verifying that an advertisement is being displayed at a billboard in accordance with an agreed contract, then the comparator 1835 analyzes one or both of the photographs taken by the modified MAST 111A of the billboard in question against an image of hie advertisement that is expected to be displayed on the billboard to determine a match or a lack of a match and, thus, perform the desired verification.

Figure 19:
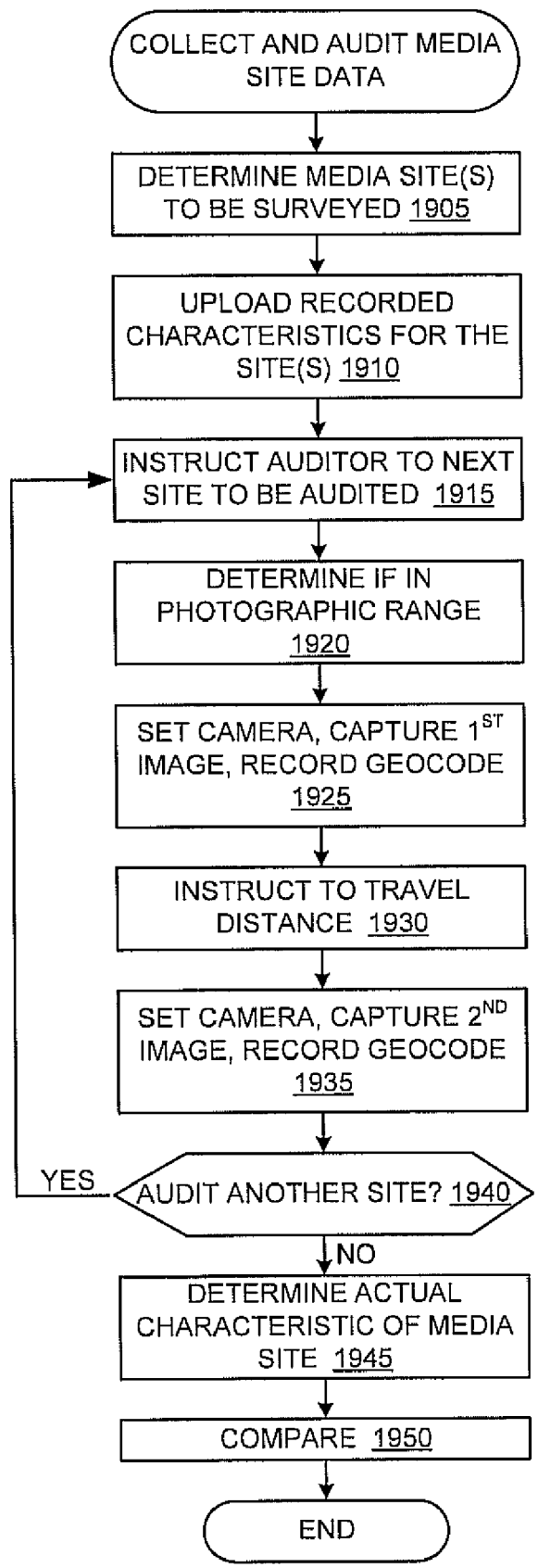
FIG. 19 is a flowchart representative of machine readable instructions that may be executed to implement the example auditing system of FIG. 18.

FIG. 19 is a flowchart representative of example machine readable instructions that may be executed to implement the example system 1800 of FIG. 18. The example process of FIG. 19 may be performed using a processor, a controller and/or any other suitable processing device. For example, the example process of FIG. 19 may be implemented in coded instructions stored on a tangible medium such as a flash memory, a read-only memory (ROM) and/or random-access memory (RAM) associated with a processor (e.g., the example processor 1705 discussed below in connection with FIG. 17). Alternatively, some or all of the example process of FIG. 19 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process of FIG. 19 may be implemented manually or as any combination(s) of any of the foregoing techniques, for example, any combination of firmware, software, discrete logic and/or hardware. Further, although the example process of FIG. 19 is described with reference to the flowchart of FIG. 19, other methods of implementing the process of FIG. 19 may be employed. For example, the order of execution of the blocks may be changed, and/or some of the blocks described may be changed, eliminated, sub-divided, or combined. Additionally, any or all of the example process of FIG. 19 may be performed sequentially and/or in parallel by, for example, separate processing threads, processors, devices, discrete logic, circuits, etc.

The example process of FIG. 19 begins with determining one or more media sites to be surveyed or audited (block 1905). The geocodes and other recorded data for each media site in the list of the media sites to be surveyed is uploaded (block 1910), for example, into a memory of the modified MAST 111A. Mile following example assumes the modified MAST 111A is mounted on a roof of a vehicle. As noted above, other examples do utilize not a vehicle).

The instructor 1815 directs the driver of a vehicle or other operator carrying the MAST 111A to a location that is within a certain range of the recorded location of the media site (block 1915). The instructions may be in the form of any type of audio and/or visual signals. For example, the instructions may be played through speakers by navigation software associated with the MAST 111A. In addition, the instructions may be provided in any level of detail including, for example, turn-by-turn instructions to explicitly guide the operator to the recorded location.

After it is determined that the image capture device is within a certain range of the recorded location of the media site (block 1920), the modified MAST 111A adjusts the settings of the image capture device (e.g., tilt, pan, zoom, as detailed above), a first image of the recorded location is captured, and the location (e.g., geocodes) of the location from which the first image was captured is recorded (block 1925). As noted above, the captured image may be a still image, a video, a sound, a high resolution photograph, etc. In addition, other data (e.g., a timestamp) may be recorded as well.

Next, the instructor 1815 directs the operator to travel a short distance (block 1930) to a second location. The second location is also within photographic range of the recorded location of the media site. The image capture device settings are adjusted, a second image is captured of the recorded location of the media site from the second location, and the location of the second location (e.g., geocodes) and/or the MAST 111A at the time of the photograph is recorded (block 1935). As noted above, the captured image may be a still image, a video, a sound, a high resolution photograph, etc. In addition, other data (e.g., a timestamp) may be recorded as well.

The example process also determines if another media site is to be audited (block 1940). If so control returns to block 1915. If no oilier media sites are to be audited, control advances to block 1945.

Characteristics of the recorded location of the media site are determined from the first and/or second images (block 1945). For example, the actual location of the media site may be calculated through one or more triangulation techniques. In addition, any or all of the condition of the media site, the indicia included on the media site, and/or the type of media presented on the media site, may be determined from the first and/or second images. The characteristics of the media site are compared to the recorded characteristics (block 1950) by, for example the comparator 1835. The comparison determines the accuracy of the recorded data (e.g., the data saved in the databases 105, 1810 detailed above) and/or whether the state of the media site matches an expected condition. If there is a discrepancy between an actual characteristic of the media site and the recorded data about the media site, the recorded data may be updated and/or a report of the discrepancy can be generated and/or sold. In addition, although described as occurring at the computer 1835, the determination of the characteristics of the recorded location of the media site (block 1945) and the comparison (block 1950) may occur at the first location, the second location, or anywhere else and at any time.

Information about any discrepancies may be particularly important, for example to advertisers. For example, an advertiser who paid for a billboard at a specific location off of a highway that is to be illuminated during certain hours for a specific number of weeks or days would be interested in any data about the actual characteristics of the media site. For example, if the billboard is not illuminated, the billboard may be visible to passing traffic for less than the agreed time every day. Also, if a billboard is obstructed by overgrown vegetation, the billboard may be less valuable to advertisers. The example process may also be used by media outlets, consumer advocacy groups and/or other companies for intelligence gathering such as, for example, to survey the price of gas at one or more gas stations, to determine information about the advertising strategies of one or more competitors, etc.

The processor platform 1700 shown and described in connection with FIG. 17 can be used to execute the instructions of FIG. 19 to implement the system of FIG. 18.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to audit media site data, the method comprising:
   determining a media site to be surveyed, the media site having a recorded location;
   directing an operator to a first data location;
   adjusting a pan and tilt mechanism to point an image capturing device towards the recorded location and capturing a first image of the media site at the recorded location from the first data location;
   directing the operator to a second data location;
   adjusting the pan and tilt mechanism to point the image capturing device towards the recorded location and capturing a second image of the media site at the recorded location from the second data location;

calculating an actual location of the media site based on data from the first image and the second image; and comparing the recorded location and the actual location to determine the accuracy of the recorded location.

2. A method as defined in claim 1, further comprising recording a pan angle and a tilt angle of the image capturing device associated with the capture of the first image.

3. A method as defined in claim 1, further comprising recording a first geocode associated with the first data location and a second geocode associated with the second data location, wherein using data from the first image and the second image to calculate the actual location of the media site comprises performing triangulation using the first and second geocodes.

4. A system to audit media site data, the system comprising:
a memory to store a recorded location of a media site to be audited;
an instructor to provide instructions to guide an operator to a first data location and a second data location;
an image capturing device to automatically capture a first image of the media site at the recorded location from the first data location and a second image of the media site at the recorded location from the second data location;
a pan and tilt mechanism to adjust the image capturing device to a first pan and a first tilt to capture the first image and to a second pan and a second tilt to capture the second image; and
a comparator to calculate an actual location based on data from the first image, the second image, and the pan and tilt mechanism, and to compare the recorded location and the actual location to determine the accuracy of the recorded location.

5. A system as defined in claim 4, further comprising a GPS receiver to receive geocodes of the first data location and the second data location, the actual location being calculated through triangulation based on the first and second geocodes.

6. A system as defined in claim 4, wherein the comparator uses data from one or more of the first image or the second image to determine an actual characteristic of the media site and compares the actual characteristic to a recorded characteristic stored in the memory.

7. A system as defined in claim 6, wherein the characteristic is a location, a state of illumination, an environmental condition, a condition of nearby vegetation, a type of sign, a condition of sign, a text, a picture, a character, an image, a price, a direction, a trademark, a logo, a date, a time, an advertising requirement, a contract term, or a quality.

8. A method to audit signage comprising:
directing an operator to a signage location;
detecting a boundary of the signage;
adjusting a pan and tilt mechanism to position an image capturing device toward the signage based on the detected boundary of the signage;
capturing an image of signage at the signage location;
detecting an actual characteristic of the signage based on the image; and
comparing the actual characteristic to an expected characteristic.

9. A method as defined in claim 8, wherein the expected characteristic includes a recorded location, and further comprising:
determining an actual location of the signage based on the image; and
comparing the actual location with the recorded location to verify the recorded location.

10. A method as defined in claim 8, wherein the expected characteristic includes a recorded condition of the media site and further comprising:
determining a current condition of the signage based on the image; and
comparing the current condition with the recorded condition to verify the recorded condition.

11. A method as defined in claim 8, wherein the expected characteristic includes recorded indicia and further comprising:
determining the actual indicia of the signage based on the image; and
comparing the actual indicia with the recorded indicia to determine if the recorded indicia was actually presented on the signage.

12. A method as defined in claim 11, wherein the indicia is one or more of a text, a picture, a character, an image, a price, a direction, a trademark, a logo or a sign type.

13. A method as defined in claim 11, further comprising recording a time and date when capturing the image of the signage.

14. A method as defined in claim 11, further comprising recording a geocode of the signage location.

15. A system to audit signage comprising:
an instructor to direct an operator to a signage location;
an image capturing device to capture an image of a sign at the signage location;
a pan and tilt mechanism to adjust the image capturing device based on a size of the sign at the signage location; and
a comparator to compare an actual characteristic of the sign based on the image to an expected characteristic.

16. A system as defined in claim 15, wherein the expected characteristic comprises a recorded location of the sign, and the actual characteristic comprises an actual location of the sign.

17. A system as defined in claim 15, wherein the expected characteristic comprises a recorded condition of the sign, and the actual characteristic comprises a current condition of the sign.

18. A system as defined in claim 15, wherein the expected characteristic comprises recorded indicia of the sign, and the actual characteristic comprises actual indicia of the sign, and wherein the comparator compares the actual indicia with the recorded indicia to determine if the recorded indicia was actually presented on the sign.

19. A system as defined in claim 18, wherein the indicia comprises one or more of a text, a picture, a character, an image, a price, a direction, a trademark, a logo or a sign type.

20. A system as defined in claim 15 further comprising a processor to record a date and time when capturing an image of the sign.

21. A system as defined in claim 15, further comprising a receiver to obtain a geocode of the signage location.

* * * * *